US011781868B2

(12) United States Patent
Knutson et al.

(10) Patent No.: US 11,781,868 B2
(45) Date of Patent: Oct. 10, 2023

(54) SYSTEM AND METHOD FOR GNSS REFLECTIVE SURFACE MAPPING AND POSITION FIX ESTIMATION

(71) Applicant: Aptiv Technologies (2) S.à r.l., Luxembourg (LU)

(72) Inventors: Eric P. Knutson, Kokomo, IN (US); Bradley S. Coon, Russiaville, IN (US); Linh N. Pham, Kokomo, IN (US)

(73) Assignee: Aptiv Technologies (2) S.à r.l., Luxembourg (LU)

( * ) Notice: Subject to any disclaimer, the term of this patent is extended or adjusted under 35 U.S.C. 154(b) by 0 days.

(21) Appl. No.: 17/509,406

(22) Filed: Oct. 25, 2021

(65) Prior Publication Data

US 2022/0113434 A1 Apr. 14, 2022

Related U.S. Application Data

(63) Continuation of application No. 16/547,812, filed on Aug. 22, 2019, now Pat. No. 11,187,534.

(51) Int. Cl.
*G01C 21/16* (2006.01)
*G01S 19/22* (2010.01)
(Continued)

(52) U.S. Cl.
CPC .............. *G01C 21/16* (2013.01); *G01S 19/22* (2013.01); *G01S 19/40* (2013.01); *G01S 19/428* (2013.01); *G01S 19/47* (2013.01); *G01S 19/49* (2013.01)

(58) Field of Classification Search
CPC ........ G01S 19/22; G01S 19/40; G01S 19/428; G01C 21/38
See application file for complete search history.

(56) References Cited

U.S. PATENT DOCUMENTS

| 6,292,759 B1 | 9/2001 | Schiffmann |
| 8,442,425 B2 | 5/2013 | Walker et al. |

(Continued)

FOREIGN PATENT DOCUMENTS

| CN | 105068091 A | * 11/2015 |
| CN | 105068091 A | 11/2015 |

(Continued)

OTHER PUBLICATIONS

Pseudo-range. (2001). Hargrave's Communications Dictionary. Wiley. Credo Reference: https://search.credoreference.com/content/entry/hargravecomms/pseudo_range/0 (Year: 2001).*

(Continued)

*Primary Examiner* — Bernarr E Gregory
*Assistant Examiner* — Fred H Mull
(74) *Attorney, Agent, or Firm* — Billion & Armitage

(57) ABSTRACT

A system for generating a 3D reflective surface map includes a positioning system, one or more antennas co-located with the positioning system, and a processing system. The positioning system calculates a position estimate. The one or more antennas co-located with the positioning system are configured to receive at least one reflected global navigation satellite system (GNSS) signal associated with a respective GNSS satellite and wherein a pseudo-range to the GNSS satellite is determined based on the reflected GNSS signal. The processing system is configured to receive the position estimate and the pseudo-ranges calculated with respect to each reflected GNSS signal, wherein the processing system maps a reflective surface based on the calculated pseudo-range provided by the reflected GNSS signals, the position estimate, angle-of-arrival of each reflected GNSS signal, and known satellite location of each respective GNSS satellite.

12 Claims, 14 Drawing Sheets

(51) Int. Cl.
*G01S 19/42* (2010.01)
*G01S 19/49* (2010.01)
*G01S 19/40* (2010.01)
*G01S 19/47* (2010.01)

(56) References Cited

U.S. PATENT DOCUMENTS

| | | | |
|---|---|---|---|
| 9,562,976 B2 | 2/2017 | Van Diggelen et al. | |
| 9,945,956 B2 | 4/2018 | Chhokra et al. | |
| 11,187,534 B2* | 11/2021 | Knutson | G01S 19/39 |
| 2004/0239560 A1 | 12/2004 | Coatantiec et al. | |
| 2006/0194562 A1 | 8/2006 | Marrah et al. | |
| 2008/0090514 A1 | 4/2008 | Yegin et al. | |
| 2009/0102707 A1 | 4/2009 | Elwell et al. | |
| 2009/0216447 A1 | 8/2009 | Uchida | |
| 2012/0314733 A1 | 12/2012 | Tominaga et al. | |
| 2012/0319898 A1* | 12/2012 | Tominaga | G01S 19/22 |
| | | | 342/357.61 |
| 2015/0035700 A1 | 2/2015 | Van Diggelen et al. | |
| 2016/0146945 A1 | 5/2016 | Kamijo et al. | |
| 2016/0290805 A1 | 10/2016 | Irish et al. | |
| 2016/0363670 A1 | 12/2016 | Ben-Moshe et al. | |
| 2017/0067999 A1 | 3/2017 | Chhokra et al. | |
| 2018/0045804 A1 | 2/2018 | Owen | |
| 2018/0074201 A1 | 3/2018 | Sakai et al. | |
| 2018/0292839 A1 | 10/2018 | Wei et al. | |
| 2019/0033465 A1* | 1/2019 | Kido | G01S 19/22 |
| 2019/0383948 A1 | 12/2019 | Hoeferlin et al. | |
| 2021/0011171 A1* | 1/2021 | Miyamoto | G01S 19/22 |
| 2022/0026583 A1* | 1/2022 | van Diggelen | G01S 19/22 |

FOREIGN PATENT DOCUMENTS

| | | | | |
|---|---|---|---|---|
| DE | 102017204615 A1 * | 9/2018 | | G01S 19/22 |
| DE | 102018116298 A1 | 1/2020 | | |
| JP | 2010145179 A * | 7/2010 | | |

OTHER PUBLICATIONS

L.-T. Hsu et al., Assessment of QZSS L1-SAIF for 3D Map-Based Pedestrian Positioning Method in an Urban Environment, Proceedings of the 2015 International Technical Meeting, ION ITM 2015, p. 331-342, Jan. 2015 (Year: 2015).*
Human English Translation of CN 105068091 A (Year: 2023).*
English Translation of CN 105068091 A, 2021.
102018116298A1, "English translation of DE102018116298A1", 10 pages.
Miura, et al., "GPS Multipath Detection and Rectification using 3D Maps", Proceedings of the 16th International IEEE Annual Conference on Intelligent Transportation Systems (ITSC 2013), Oct. 2013, 1528-1534 pages.
Yutaro, et al., "Optimization of 3D building models by GPS measurements", GPS (Conference on üutdoor Advertising Research), Springer, Zurich, vol. 21, No. 1 Dec. 7, 2015, pp. 65-78.
Partial European Search Report for EP Application No. 20190890.2, dated Jan. 15, 2021, 13 pages.

* cited by examiner

SYSTEM AND METHOD FOR GNSS REFLECTIVE SURFACE MAPPING AND POSITION FIX ESTIMATION

CROSS-REFERENCE TO RELATED APPLICATION

This is a continuation application and claims benefit of U.S. patent application Ser. No. 16/547,812 (U.S. Pat. No. 11,187,534), filed Aug. 22, 2019, the entire disclosure of each of which is hereby incorporated by reference.

FIELD

This disclosure is generally directed to global navigation satellite systems (GNSS) and, more specifically to systems, devices and methods for generating and utilizing 3D maps from GNSS signals and providing position estimates from GNSS signals.

BACKGROUND

Global navigation satellite systems (GNSSs) refers generally to systems that allow a position fix to be determined based on signals received from a plurality of satellites. Each GNSS satellite transmits a GNSS signal that identifies the satellite and the time the signal was transmitted. A GNSS receiver or antenna is configured to receive each of the GNSS signals transmitted by the visible GNSS satellites and utilizes the time-of-flight of each GNSS signal along with known position of each GNSS satellite to determine a pseudo-range or distance from the GNSS receiver to each GNSS satellite. The GNSS receivers utilizes the plurality of determined pseudo-ranges from known satellites to trilaterate a position of the GNSS receiver in three-dimensional space. Types of GNSS systems include Global Positioning System (GPS), GLONASS, Galileo, BeiDou, and others.

GNSSs are typically extremely accurate. However, urban environments defined by the presence of tall buildings present a particular challenge to GNSSs. Not only do the buildings block at least some of the GNSS signals—reducing the number of signals available to make a position fix estimate—but some of the signals that reach the GNSS receiver are received as a result of one or more reflections from the buildings. The increase in time-of-flight associated with reflected GNSS signals leads to erroneous pseudo-range estimates and therefore erroneous GNSS position fix estimates.

SUMMARY

According to one aspect, a system for generating a 3D reflective surface map is provided. The system includes a positioning system, one or more antennas co-located with the positioning system, and a processing system. The positioning system calculates a position estimate. The one or more antennas co-located with the positioning system are configured to receive at least one reflected global navigation satellite system (GNSS) signal associated with a respective (GNSS) satellite and wherein a pseudo-range to the GNSS satellite is determined based on the reflected GNSS signal. The processing system is configured to receive the position estimate and the pseudo-ranges calculated with respect to each reflected GNSS signal, wherein the processing system maps a reflective surface based on the calculated pseudo-range provided by the reflected GNSS signals, the position estimate, angle-of-arrival of each reflected GNSS signal, and known satellite location of each respective GNSS satellite.

According to another aspect, a system for calculating position estimates is provided. The system includes a GNSS antenna/receiver configured to receive GNSS signals from a plurality of satellites and to calculate pseudo-ranges based on the received GNSS signals. The system further includes a processor system that includes a processor, a satellite location database, and a 3D reflective surface map of a surrounding area. The processor system is configured to detect erroneous pseudo-ranges based on a current position estimate and corrects erroneous pseudo-ranges based on the 3D reflective surface map, the current position estimate, and satellite location retrieved from the satellite location database, wherein the processor system calculates an updated position estimate based on the pseudo-ranges collected from LOS GNSS signals and corrected pseudo-ranges.

A method of processing global navigation satellite system (GNSS) signals received from a plurality of GNSS satellites to determine position includes calculating for each GNSS signal received a pseudo-range that estimates a distance between a local antenna and the GNSS satellite that generated the GNSS signal. The method further includes detecting erroneous pseudo ranges based at least in part on comparisons of each calculated pseudo-range with a current position estimate. The method further includes determining, based on information regarding a location of the GNSS satellite that generated the GNSS signal, a current position estimate, and a 3D reflective surface map of surrounding 3D objects, a surface that reflected the GNSS signal. The erroneous pseudo range is then corrected based on the location of the GNSS satellite, the location of the surface that reflected the GNSS signal, and the current position estimate. An updated position estimate is generated based on the calculated pseudo-ranges and the corrected pseudo-ranges.

DETAILED DESCRIPTION

A typical global navigation satellite system (GNSS) includes a plurality of satellites each transmitting individual GNSS signals carrying detailed time-of-flight information. GNSS receivers are configured to receive the GNSS signals and determine from the time-of-flight information provided the distance (referred to herein as a pseudo-range) from the GNSS receiver to the GNSS satellite. GNSS signals that are unobstructed are referred to as line-of-sight (LOS), while those that are obstructed are referred to as non line-of-sight (NLOS) or reflected signals. Processing of GNSS signals that are NLOS (i.e., reflected) will result in inaccurate pseudo-ranges and therefore inaccurate position fix estimates.

According to one aspect, this disclosure is directed to a system and method of utilizing GNSS signals—in particular reflected GNSS signals—to build 3D reflective surface maps. The system may include a position estimate system and a plurality of shielded antennas. The position estimate system may include one or more antennas and/or inertial measurement unit (IMU) capable of generating a highly accurate position estimate. The plurality of shielded antennas are utilized to receive GNSS signals reflected from nearby building. Pseudo-ranges calculated based on the time of flight of the received GNSS signals are compared to the real truth (RT) position estimate of the system, wherein pseudo-ranges that disagree with the position estimate generated by the position estimate system are determined to be reflections. Based on position estimates and the known location of the satellite, the reflected signals received at the plurality of shielded antennas are utilized to estimate the location of the surface that reflected the GNSS signal. In addition to mapping the location of the 3D surface, a refractive index of the mapped surface is determined based on variance associated with the mapped surface. Mapped surfaces are aggregated to generate a 3D reflective surface map, which may include refractive indexes assigned to various surfaces within the 3D reflective surface map.

According to another aspect of the disclosure, the 3D reflective surface map is utilized in combination with received GNSS signals—including NLOS GNSS signals reflected from one or more buildings—to calculate improved position estimates in urban canyons. In this way, the usable portion of the sky is expanded beyond those satellites in direct line-of-sight with the antenna.

Figure 1:
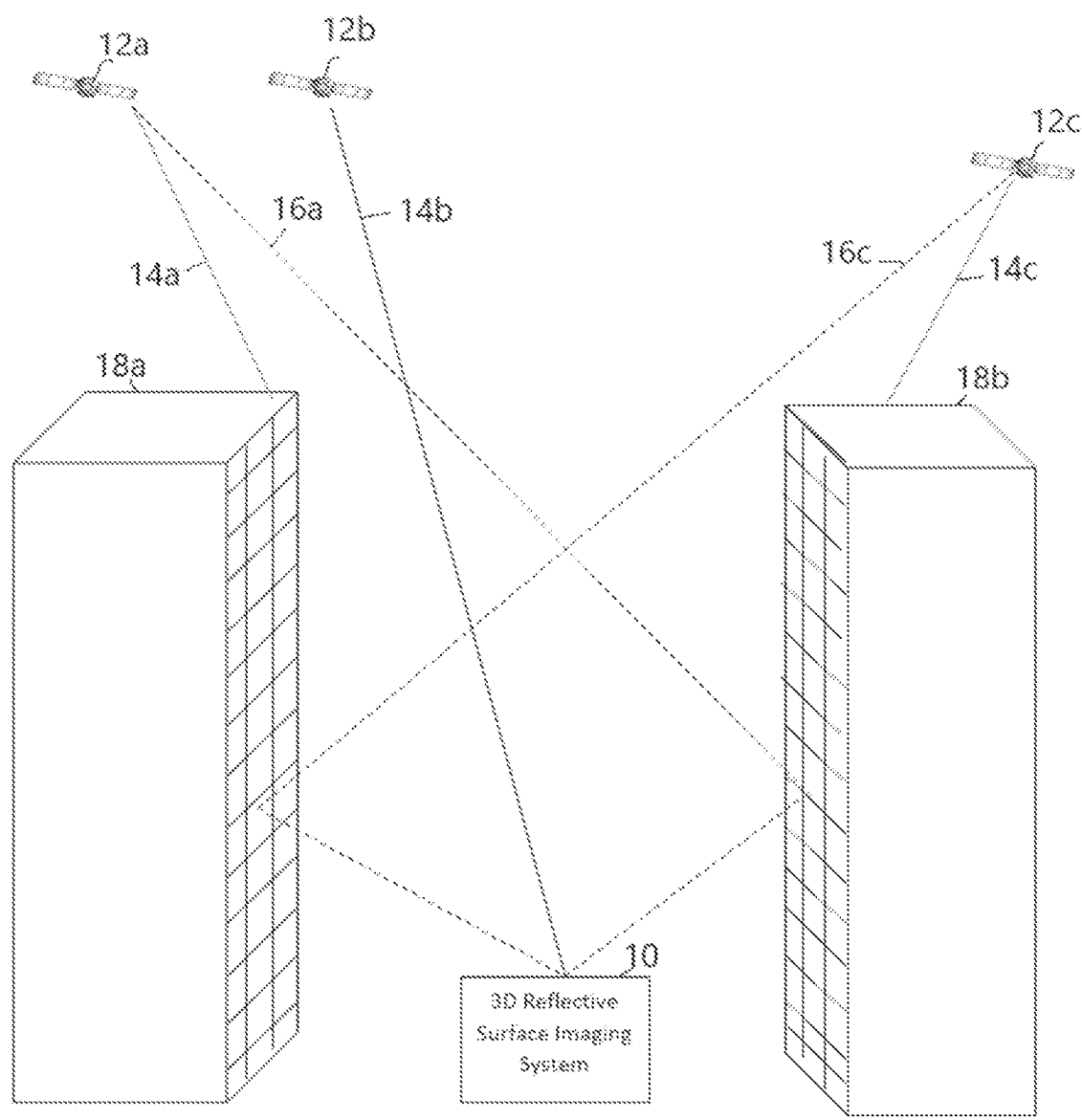
FIG. 1 is a schematic diagram illustrating operation of a 3D reflective surface imaging system receiving GNSS signals from satellites in an urban canyon consistent with one or more aspects of this disclosure.
Figure 2:
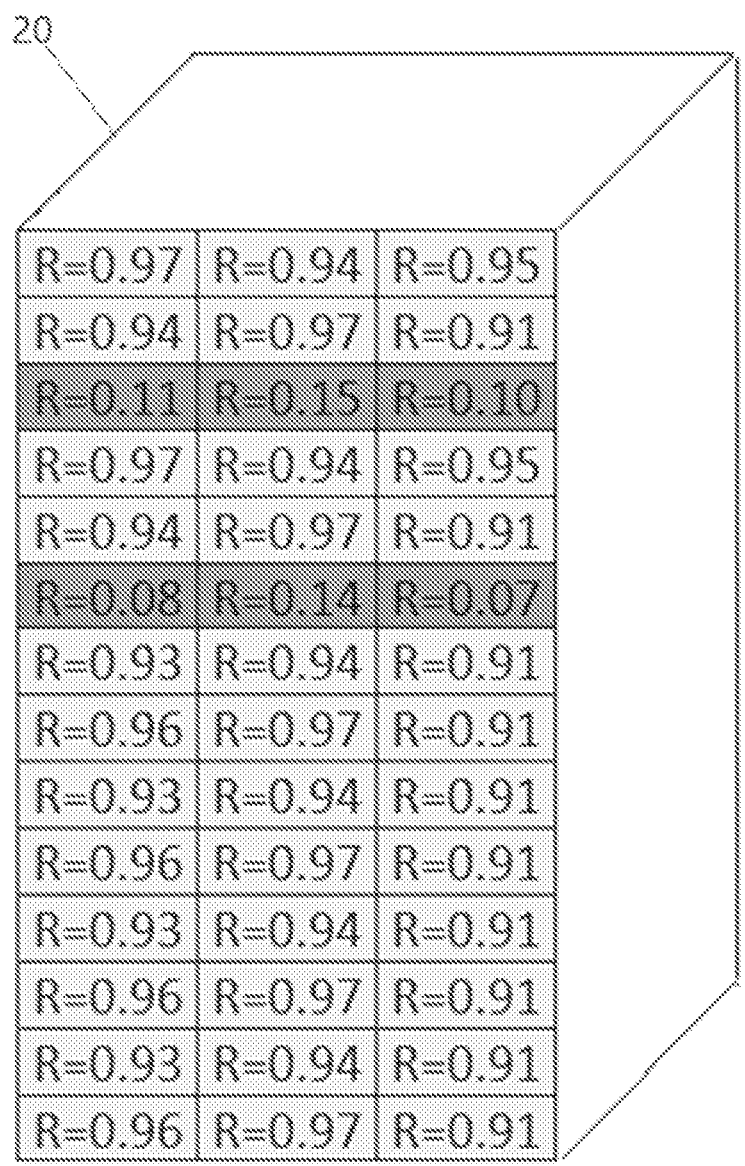
FIG. 2 is an example of a 3D reflective surface map generated by the 3D reflective surface imaging system that illustrates example refractive index values assigned to the 3D surface consistent with one or more aspects of this disclosure.

FIG. 1 is a schematic diagram illustrating operation of a 3D reflective surface imaging system 10 receiving GNSS signals from satellites 12a, 12b and 12c in an urban canyon according to some embodiments. In the embodiment shown in FIG. 1, a plurality of GNSS satellites 12a, 12b and 12c transmit GNSS signals. Depending on the location of the GNSS satellite 12a, 12b, and 12c, the location of 3D reflective surface imaging system 10, and buildings 18a and 18b, the GNSS signals can be line-of-sight (LOS) (as illustrated by solid lines 14a, 14b, 14c), or non-line-of-sight (NLOS) (as illustrated by dashed lines 16a and 16c, originating from GNSS satellites 12a and 12c, respectively). For example, in the embodiment shown in FIG. 1, GNSS satellite 12a is not line-of-sight, as illustrated by the termination of line 14a at the rooftop of the building 18a. However, a GNSS signal 16a from GNSS satellite 12a reflects from building 18b to 3D reflective surface imaging system 10. Likewise, GNSS satellite 12c is not line-of-sight as illustrated by the termination of line 14c at the rooftop of the building 18b, but GNSS signal 16c from GNSS satellite 12c reflects from building 18a to 3D reflective surface imaging system 10. As discussed in the background, GNSS positioning relies on the time-of-flight of the GNSS signal in order to determine the pseudo-range or distance from the antenna to the GNSS satellite. As illustrated visually in FIG. 1, the reflection of the GNSS signals 16a and 16c increases the time of flight of the signals and therefore increases the pseudo-range or distance from the imaging system 10 to the respective GNSS satellites 12a and 12c. As a result, the position fix estimate of the GNSS system—based on the exaggerated pseudo-range—is incorrect. As described in more detail with respect to FIGS. 2-7, the reflected signals 16a and 16c provide information regarding the surrounding environment and can be utilized to build a 3D map of the surrounding environment. In some embodiments, the reflected signals are utilized to determine a refractive index associated with the surfaces of the 3D map, wherein the refractive index defines how coherently incident signals are reflected. A flat, mirror-like surface will result in specular reflection in which the incoming signal is reflected into a single outgoing direction (e.g., angle of reflection=the angle of incidence). In contrast, a surface that is rough will result in diffuse reflection in which the incoming signal is reflected in a plurality of directions. An example is provided in FIG. 2, which illustrates one side of a surface divided into a plurality of regions assigned a refractive index value ranging between 0 (diffuse reflection) and 1 (specular reflection). As described with respect to 8-12, the 3D surface map is subsequently utilized to correct the pseudo-ranges calculated with respect to reflected signals allowing useful information to be extracted from reflected signals. In some embodiments, the refractive index value assigned to each 3D surface is utilized to determine the confidence level associated with the reflected signals. In this way, utilization of a 3D reflective surface map allows the portion of the usable sky to be expanded to include GNSS satellites that are not line-of-sight.

Figure 3A:
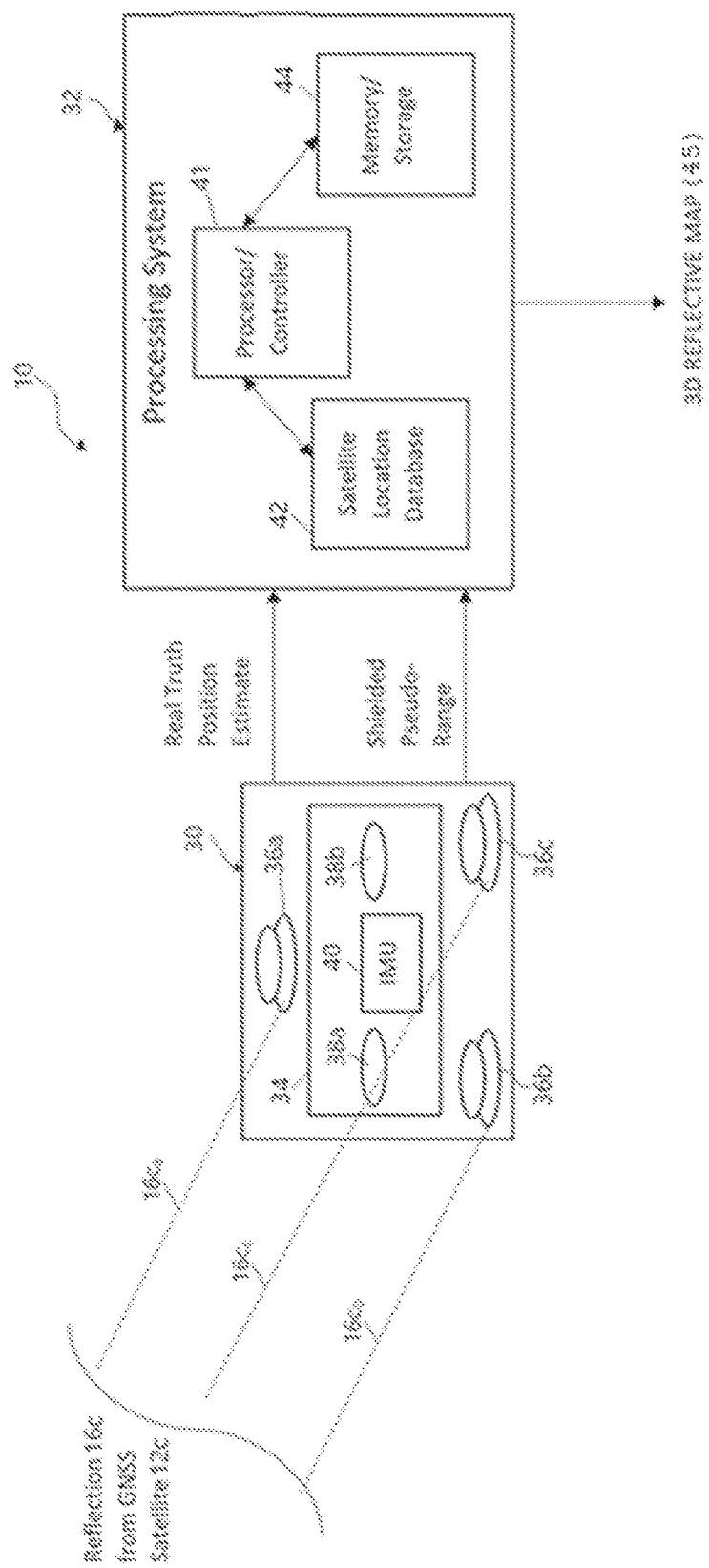
FIGS. 3a and 3b are schematic diagrams of 3D reflective surface imaging systems consistent with aspects of this disclosure.

Referring now to FIGS. 3a-5, the system and method of generating the 3D reflective surface map is provided. In the embodiment shown in FIG. 3a the 3D reflective surface imaging system 10 includes an antenna system 30 and a processing system 32. In some embodiments, the antenna system 30 includes a positioning system 34 utilized to generate a position estimate. In some embodiments, the positioning system 34 utilizes one or more antennas and available GNSS satellites to generate the position estimate. In other embodiments, positioning system 34 utilizes one or more antennas 38a, 38b in combination with an inertial measurement unit (IMU) 40. In some embodiments, the information from antennas 38a, 38b is combined with measurements from IMU 40 to provide high-precision position fix estimates within urban canyons (but at a higher cost than a typical GNSS receiver). In some embodiments, the positioning system 34 (e.g., high-precision positioning system 34) utilized during the 3D reflective surface mapping stage differs from the system utilized to generate position fix estimates. In some embodiments, antenna system 30 is mounted on a vehicle, wherein the antenna system 30 collects data from the plurality of GNSS satellites at a plurality of epochs (instances in time). In some embodiments, processing system 32 is located on the vehicle utilized to house the shielded antennas 36a-36c and positioning system 34. In some embodiments, antenna system 30 further includes a plurality of antennas 36a, 36b, and 36c utilized to receive (primarily) reflected GNSS signals. In some embodiments, directional antennas or antenna arrays are utilized to receive GNSS signals likely to be the result of reflections, while in other embodiments physical shielding is utilized—as shown in FIG. 3a—to receive GNSS signals likely to be the result of reflections.

In the embodiment shown in FIG. 3a, the plurality of shielded antennas 36a, 36b, and 36c are positioned at known distances from one another to form a triangular geometry. In some embodiments, the plurality of shielded antennas 36a-36c are approximately co-located with the positioning system 34 to allow the position estimate of the shielded antennas 36a-36c to be known. In some embodiments, the shielded antennas 36a-36c are equidistant from one another. In the embodiment shown in FIG. 3, shielded antennas 36a-36c are located in a single plane (e.g., horizontal plane or xy plane) and are therefore capable of determining a two-dimensional Angle-of-Arrival (AoA) within the plane defined by the plurality of antennas based on the time of arrival of a respective GNSS signal at each of the plurality of GNSS satellites. As described in more detail below, in some embodiments, knowledge regarding the location of the satellite relative to the antennas is utilized in combination with the determined two-dimensional AoA to calculate the AoA in three-dimensional space. In some embodiments, additional shielded antennas may be utilized. For example, in one embodiment a fourth antenna may be included that is positioned in a plane separate from the one defined by antennas 36a, 36b, and 36c—such as above or below the antennas shown. In some embodiments, utilizing a fourth antenna located in a vertical plane relative to the other shielded antennas allows the AoA to be determined in three-dimensional space.

In the embodiment shown in FIG. 3a, the shielded antennas 36a-36c includes a physical shield located over a top portion of the antenna that prevents a majority of line-of-sight (LOS) GNSS signals from reaching the antenna, but allows reflected GNSS signals to be received. In some embodiments, the purpose of the shielded antennas is to receive (generally) only reflected signals and to filter those GNSS signals that are LOS. In general, LOS GNSS signals do not provide information regarding the 3D dimensions of the surrounding environment. However, in some instances a signal that changes from LOS to non-LOS (e.g., a reflection) is utilized to detect a rooftop edge or wall edge. Therefore, in some embodiments it desirable that most LOS signals be blocked, but not all.

Figure 3B:
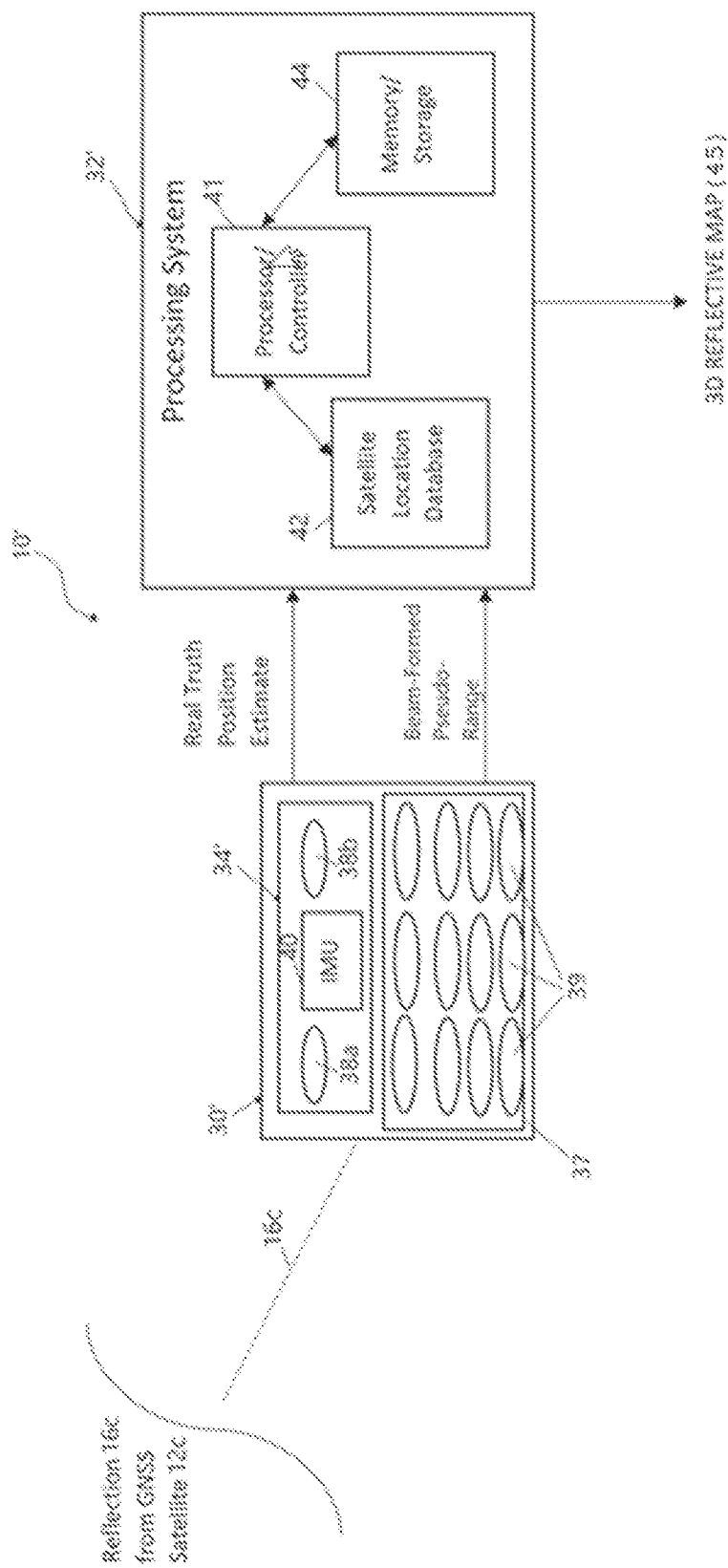
Figure 4A:
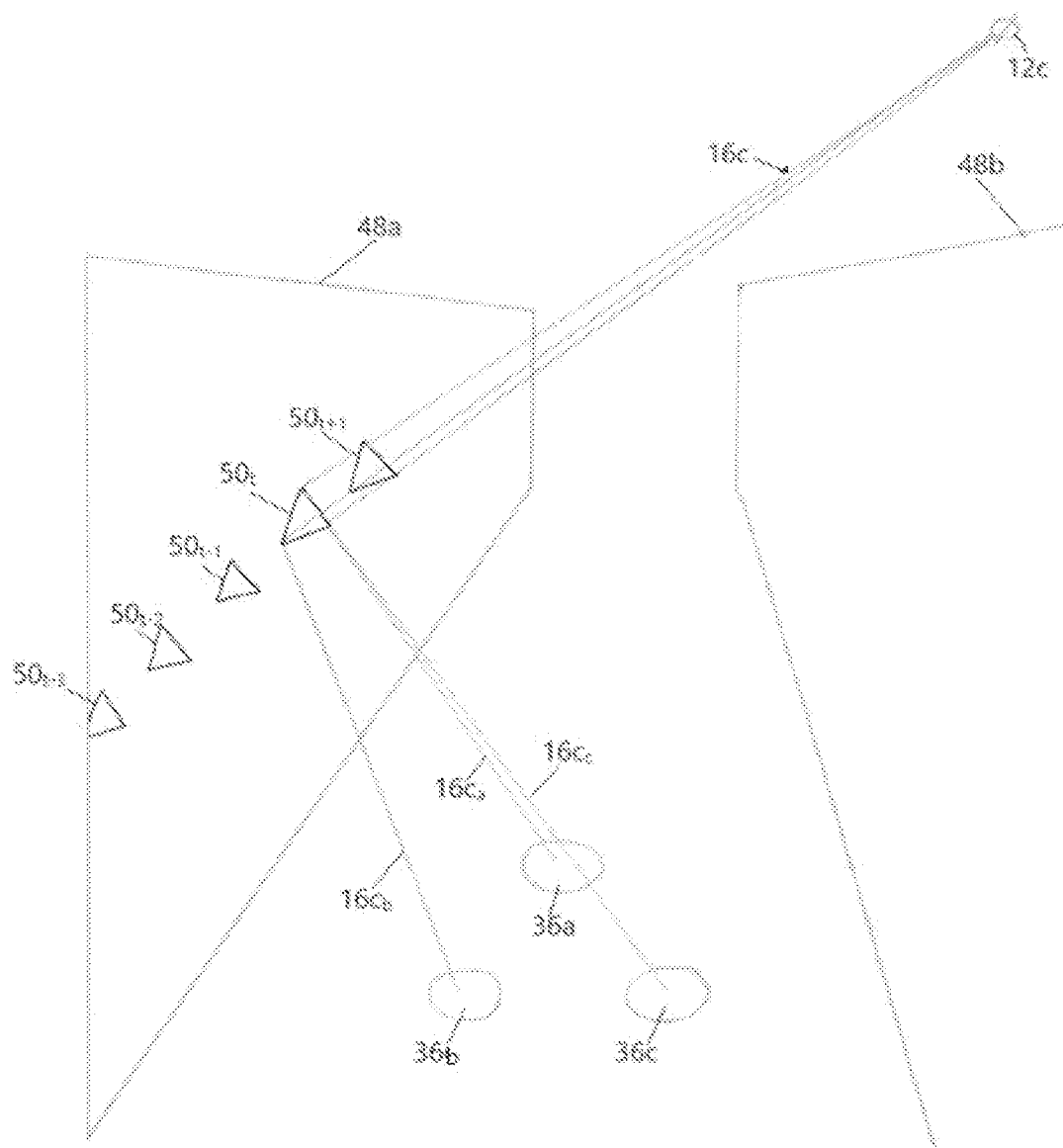
FIGS. 4a and 4b are schematic diagrams illustrating the mapping of surfaces based on GNSS signals received by the 3D reflective surface imaging system consistent with aspects of this disclosure.
Figure 4B:
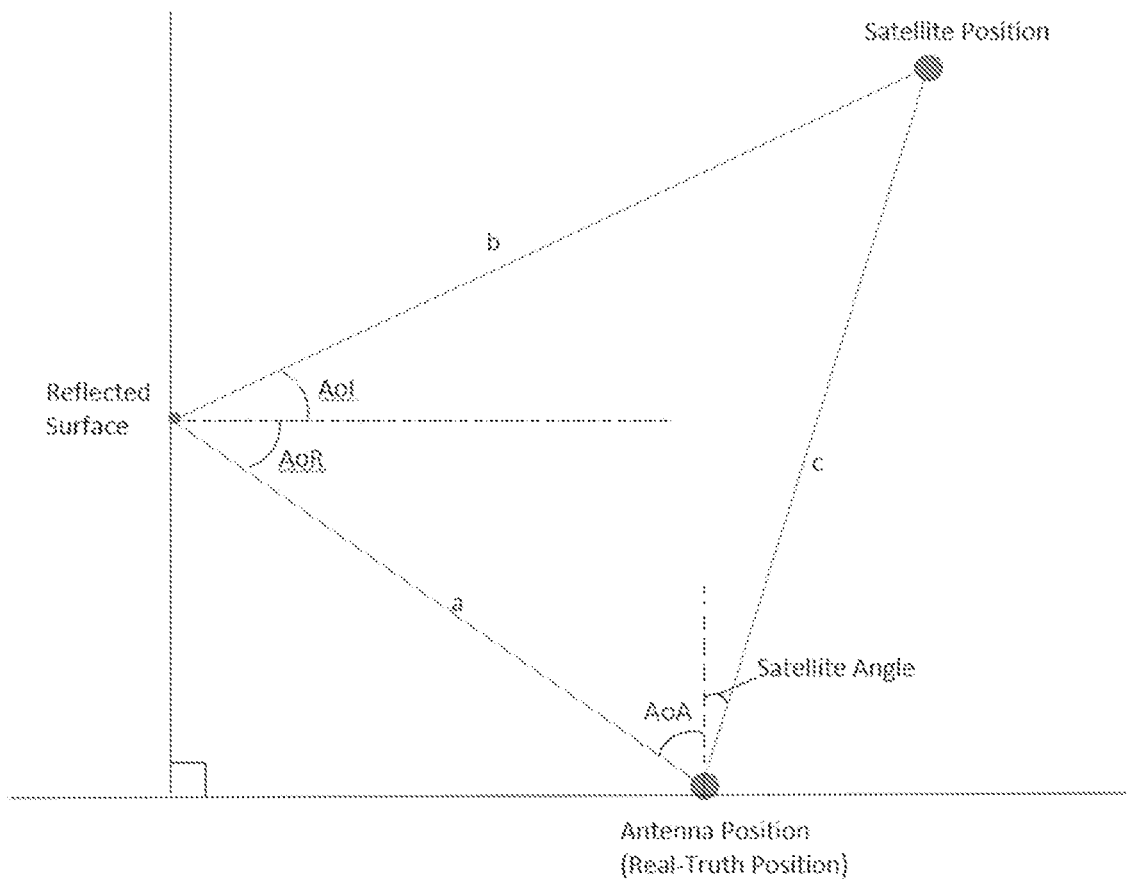

In the embodiment shown in FIG. 3b, the 3D reflective surface imaging system 10' similarly includes an antenna system 30' and a processing system 32', wherein the antenna system 30' includes a positioning system 34 and an antenna array 37, which replaces the plurality of shielded antennas 36a-36c utilized in the embodiment shown in FIG. 3a. In contrast with the embodiment shown in FIG. 3a, in which physical shielding was utilized to filter the LOS GNSS signals, the antenna array 37 is comprised of a plurality of antennas 39 configured to operate as a directional antenna. In some embodiments, processing of the received GNSS signals—referred to as beamforming or spatial filtering—combines signals received at each of the plurality of antennas in a way to cause the signals to constructively or destructively interfere with one another based on the direction the signal is traveling. That is, beamforming techniques can be utilized to spatially filter received GNSS signals based on the angle-of-arrival (AoA) of the GNSS signals. A benefit of this approach is that no physical shielding is required and processing of the received GNSS signals can be modified to change the beamforming or spatial filtering associated with the antenna array to change the allowed angle-of-arrival of incoming signals. In some embodiments, the directional capability of antenna array 37 is utilized to exclude GNSS signals at AoAs likely to be LOS signals. In this way, antenna array 37 can be configured to perform the same function as the shielded antennas 36a-36c but without requiring a physical shield to block likely LOS signals. The antenna array 37 shown in FIG. 3b includes a plurality of antennas formed in a two-dimensional array consisting of n rows of antennas and m columns of antennas. In some embodiments, although the antenna array may be organized into a two-dimensional array, processing of signals received by the antenna array 37 may simulate the presence of a plurality of individual antennas (e.g., three antennas, arranged in a particular geometry, such as that shown in FIG. 3a).

Referring to FIG. 3a, the shielded antennas 36a-36c receive a GNSS signal, which identifies the satellite that originated the GNSS signal and includes a timestamp that allows the shielded antennas 36a-36c to identify a time of flight of the signal utilized to calculate a pseudo-range associated with each received GNSS signal. In some embodiments, the pseudo-range is calculated by the hardware/software associated with the shielded antennas and communicated to the processing system utilized to generate the 3D reflective surface map. In other embodiments, the information associated with the received GNSS signal is communicated as raw data to the processing system 32, which then calculates pseudo-ranges based on the time-of-flight.

In some embodiments, a pseudo-range is calculated with respect to the GNSS signal received for each shielded antenna 36a-36c. Due to the difference in spatial location of the plurality of shielded antennas 36a-36c, the time-of-flight of the GNSS signal received at each shielded antenna 36a-36c is slightly different, resulting in unique pseudo-ranges calculated with respect to each shielded antenna 36a-36c. The variation in pseudo-ranges calculated by each shielded antenna 36a-36c with respect to the same reflected GNSS signal can be utilized to determine the Angle-of-Arrival of the reflection. In some embodiments, each of the calculated pseudo-ranges are provided to the processing system 32 for subsequent processing.

In some embodiments, processing system 32 includes a processor/controller 41, satellite location database 42, and memory/storage device 44. In some embodiments, memory/storage device 44 stores instructions executed by the processor/controller 41 to implement one or more of the steps described with respect to FIGS. 5-7. In some embodiments, antenna system 30 and processing system 32 are included as part of the same system (e.g., co-located), while in other embodiments processing system 32 is located remotely from the antenna system 30, wherein position estimates and calculated pseudo-ranges are communicated to processing system 32 for processing. For the sake of simplicity pseudo-ranges calculated based on the received GNSS signals received at the plurality of shielded antennas 36a-36c are provided as examples, but it should be understood that in other embodiments spatial filtering and/or beamforming of antenna array 37 (shown in FIG. 3b) is utilized to extract the same information from the received GNSS signals. Processing system 32 utilizes the position estimate to orient the location of the shielded antennas 36a-36c in space. In addition, processing system 32 utilizes satellite location database 42 to determine the location of the GNSS satellites relative to the shielded antennas 36a-36c. In some embodiments, processing system 32 utilizes the calculated pseudo-ranges, known positions of the satellites, and position estimates to determine whether the received GNSS signals are reflected or line-of-sight. In some embodiments, the processing system 32 determines an Angle-of-Arrival (AoA) of received GNSS signals based on the variance in pseudo-ranges measured with respect to each of the shielded antennas 36a-36c. That is, the spatial geometry of the shielded antennas 36a-36c results in variations in the time-of-flight of received GNSS signals at each respected shielded antenna, which in turn influences the calculated pseudo-range. The variance in calculated pseudo-ranges between respective shielded antennas 36a-36c can be utilized to determine the direction or Angle-of-Arrival of the received GNSS signal. In some embodiments, the calculated AoA of a received GNSS signal can be utilized in combination with knowledge regarding the location of the satellite and the position estimate of the antenna system 30 to confirm that the received GNSS signal is a reflection. Reflected GNSS signals carry information regarding the location of the reflective surface and are utilized by the processing system 32 to generate a 3D reflective map 45 of surrounding 3D surfaces. In some embodiments, the processing system 32 utilizes the pseudo-ranges associated with the reflected GNSS signals, the RT position of the shielded antennas 36a, 36b, known satellite position, and determined AoA of the received GNSS signals to calculate a location of the surface that reflected the GNSS signals. Reflective surfaces identified by the reflected GNSS signals are aggregated to form the 3D reflective map 45.

In some embodiments, the reflective surface has a geometry that corresponds with the geometry of the plurality of shielded antennas 36a-36c (shown in FIG. 3a) and/or of the antenna array 37 (shown in FIG. 3b). For example, the triangular geometry of shielded antennas 36a-36c shown in FIG. 3a results in a reflective surface having a triangular geometry. This is illustrated in the example provided in FIG. 4, in which shielded antennas 36a, 36b, and 36c are utilized to calculate a location of a reflective surface at a plurality of epochs (e.g., time steps). For example, a plurality of reflective surfaces $50_t$, $50_{t-1}$, $50_{t-2}$, $50_{t-3}$ are illustrated, each calculated at a different epoch based on the reflected GNSS signal 16c received from GNSS satellite 12c. As described above, knowledge regarding the position of the shielded antennas 36a, 36b, and 36c, the pseudo-ranges calculated by the shielded antennas 36a-36c with respect to reflected GNSS signal 16c (labeled $16c_a$, $16c_b$, and $16c_c$ to differentiate between the reflected signal utilized by each of the plurality of shielded antennas 36a, 36b, and 36c, respectively), and the location of the satellite (e.g., satellite 12c), the reflective surface (e.g., reflective surface $50_c$) can be resolved. As the shielded antennas 36a-36c move through a city, reflected GNSS signals received at different epochs are utilized to calculate a plurality of reflective surfaces (e.g., $50_t$, $50_{t-1}$, $50_{t-2}$, $50_{t-3}$), which can be aggregated to generate the 3D reflective surface map 45. In addition, although a single GNSS reflection is illustrated for the sake of simplicity in FIGS. 3a, 3b, and 4, a plurality of reflected GNSS signals originated from a plurality of GNSS satellites may be received at each epoch by the plurality of shielded GNSS antennas 36a-36c and/or antenna array 37, each reflected GNSS signal being utilized to calculate a reflective surface.

Figure 5:
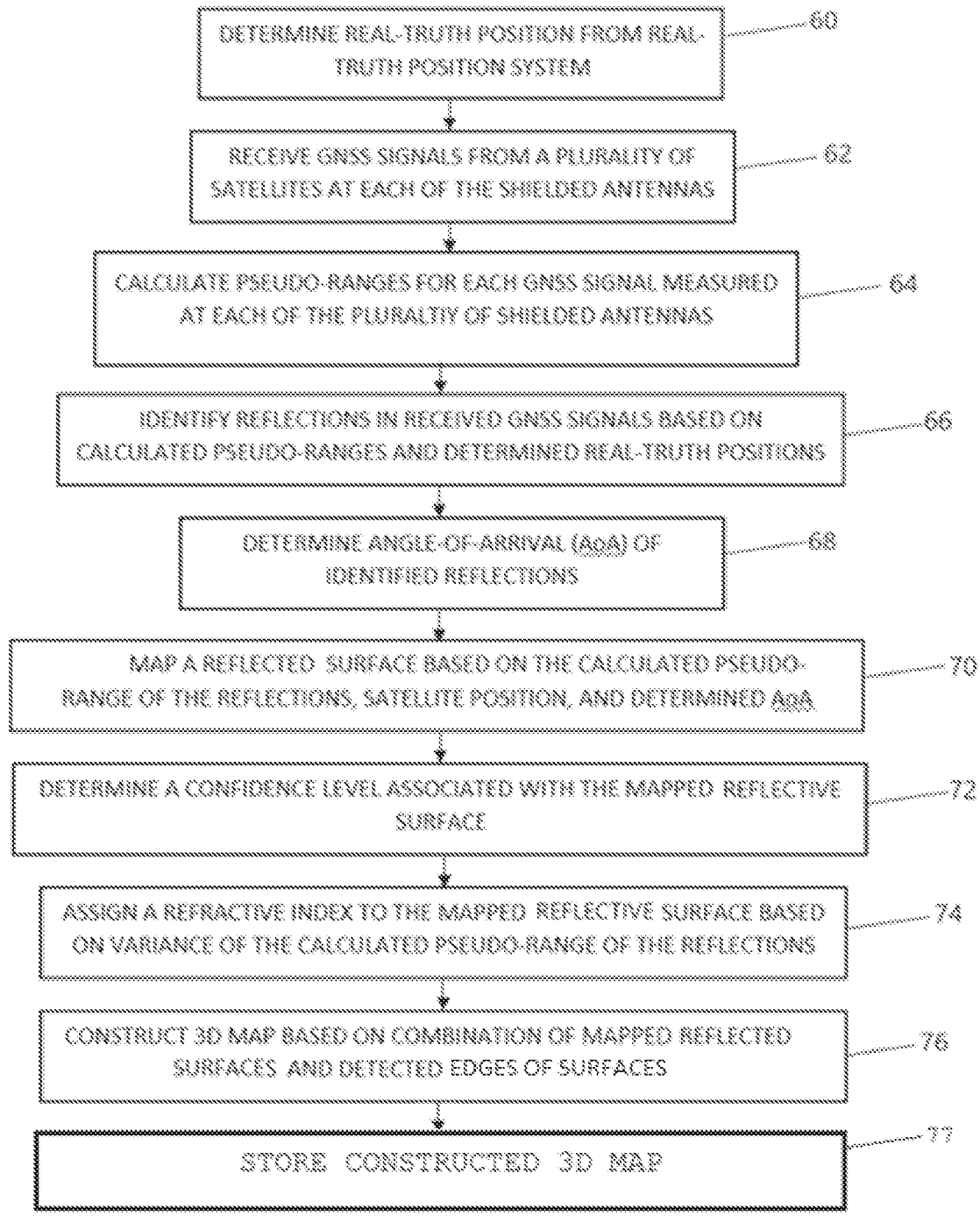
FIG. 5 is a flowchart illustrating generation of the 3D reflective surface map consistent with one or more aspects of this disclosure.

FIG. 5 is a flowchart that illustrates steps implemented by the 3D reflective surface imaging system 10 according to some embodiments. For the sake of simplicity, reference is made to the embodiments described with respect to FIGS. 3a and 4 that includes a plurality of shielded antennas, although in other embodiments an antenna array is utilized to receive the reflected GNSS signals and to determine the pseudo-range and AoA associated with the received GNSS signals.

At step 60, position of the antenna system 30 is determined based on position estimates provided by the positioning system 34. Because 3D mapping of reflective surfaces is most beneficial in urban canyons, obtaining a position of antennas may be complicated by the presence of the buildings being mapped. In some embodiments, the positioning system 34 includes one or more antennas 38a and 38b to determine position based on available LOS GNSS signals alone or in combination with an inertial measurement unit (IMU) 40 that includes a three-axis accelerometer and a three axis gyroscope configured to determine changes in position based on the accelerometer and gyroscope signals. In some embodiments, the positioning system 34 combines outputs from the one or more antennas 38a and 38b with outputs from the IMU 40 to generate a high precision position estimate. In some embodiments, accuracy of the positioning system 34 depends on accurate knowledge of an initial position of the antenna system 30. For example, in some embodiments it may be beneficial to determine a position outside of the urban canyon using a plurality of LOS GNSS satellites, and then rely on the available LOS GNSS satellites and IMU outputs to maintain a position estimate while entering the urban canyon to be mapped. In other embodiments, a variety of other tools may be utilized alone or in combination with the one or more antennas 38a and 38b and/or IMU 40 to generate a position estimate, such as WiFi location services, Bluetooth localization, and Ultra-Wideband localization.

At step 62, GNSS signals are received by the plurality of shielded antennas 36a-36c shown in FIG. 3a. As discussed previously, in some embodiments an antenna array (such as that shown in FIG. 3b) is utilized in place of the plurality of shielded antennas 36a-36c. The GNSS signals may include a plurality of GNSS signals received from a plurality of GNSS satellites. In some embodiments, GNSS signals receive include both LOS and reflected GNSS signals. However, as discussed above, in some embodiments physical shielding and/or directional beamforming is utilized to decrease the number of LOS GNSS signals that are processed. In other embodiments, all GNSS signals are retained, but via subsequent processing LOS GNSS signals are identified and discarded if not useful.

At step 64, pseudo-ranges are calculated for GNSS signals received at the one or more antennas. For example, in the embodiment including a plurality of shielded antennas 36a-36c, pseudo-ranges are calculated with respect to GNSS signals received at each individual antenna. Pseudo-range calculations are based on the time-of-flight of the received GNSS signal and represent the distance traveled by each GNSS signal to reach the receiving antenna. As illustrated in FIGS. 1 and 4, the time-of-flight of GNSS signals increases when the GNSS signal reaches the antenna via a reflection, thereby increasing the calculated pseudo-range as compared to a LOS GNSS signal received from the same GNSS satellite. In the embodiments shown in FIG. 3$a$, pseudo-ranges are calculated by each of the plurality of shielded antennas 36$a$-36$c$ for each reflected GNSS signal received, and calculated pseudo-ranges are communicated to the processing system 32 for further processing. In some embodiments, antenna system 30 captures time-of-flight of the received GNSS signal and provides the raw time-of-flight data associated with each GNSS satellite to the processing system 32 for calculation of pseudo-ranges. In some embodiments utilizing an antenna array 37 as shown in FIG. 3$b$, one or more pseudo-ranges may be calculated with respect to each GNSS signal received by the antenna array 37.

At step 66, the calculated pseudo-ranges are compared to expected values based on the position estimate provided by the positioning system 34 and known position of the satellites to determine whether the received GNSS signal represents a LOS GNSS signal or a reflected GNSS signal. Based on the position of the antenna system 30 and known position of the GNSS satellites, an expected pseudo-range can be determined assuming a LOS GNSS signal. In some embodiments, if the calculated pseudo-range is greater than the expected pseudo-range, the calculated pseudo-range is identified as a reflected GNSS signal. In some embodiments, if the calculated pseudo-range is greater than the expected pseudo-range by a threshold level (e.g., three meters), the calculated pseudo-range is identified as a reflected GNSS signal. In some embodiments, pseudo-ranges determined to represent a LOS GNSS signal are discarded, as the signals do not provide information regarding a 3D reflective surface. In some embodiments, pseudo-ranges determined to represent a LOS GNSS signal are stored and compared to pseudo-ranges collected from the same GNSS satellite at adjacent epochs (discussed in more detail with respect to FIG. 7). In some embodiments, one or more of the pseudo-ranges associated with a first subset of shielded antenna(s) (e.g., 36$a$, 36$c$) may be identified as a reflected GNSS signal while one or more of the pseudo-ranges associated with a second subset of shielded antenna(s) (e.g., 36$c$) may be identified as a LOS GNSS signal (for example, as shown in FIG. 4$a$ with respect to reflective surface 50$_{t-3}$). In some embodiments, as long as some of the calculated pseudo-ranges are determined to represent a reflected GNSS signal then calculated pseudo-ranges are stored for subsequent processing.

At step 68, an angle-of-arrival (AoA) is determined for each GNSS signal received based on the pseudo-ranges calculated by the plurality of shielded antennas 36$a$-36$c$. The AoA is calculated based on variance in the calculated pseudo-ranges measured by each of the plurality of shielded antennas due to the spatial orientation of the shielded antennas relative to one another. For example, in the embodiment shown in FIG. 3$a$, shielded antennas 36$a$, 36$b$, and 36$c$ are located at fixed positions separated from one another by known distances resulting in variations in the time of flight of GNSS reflections 16$c_a$, 16$c_b$, and 16$c_c$ originating from a particular GNSS satellite 12$c$. The difference in time of flight of GNSS reflections 16$c_a$, 16$c_b$, and 16$c_c$ results in variations in the pseudo-ranges calculated with respect to each shielded antenna. For example, the pseudo-range calculated with respect to shielded antenna 36$c$ (based on GNSS reflection 16$c_c$) is longer than the pseudo-range calculated with respect to shielded antenna 36$b$ (based on GNSS reflection 16$c_b$) due to the relative position of the respective antennas. The variance in the calculated pseudo-ranges is utilized to determine the angle-of-arrival (AoA) of the received GNSS signal. In some embodiments, AoA is determined only for those GNSS signals identified as reflected GNSS signals. In some embodiments, AoA is determined for all received GNSS signals. In some embodiments, AoA can be utilized to verify whether a received GNSS signal is a reflection or line-of-sight (LOS) based on a comparison of the expected AoA (known based on the position of the satellite) and measured AoA. For example, in the embodiment shown in FIG. 4 the location of satellite 12$c$ is known relative to the location of the antennas 36$a$-36$c$. In this example, the AoA indicates the signal arrived from a direction not aligned with the location of the satellite 12$c$ (i.e., AoA from the left, rather than the right), confirming the identification of the signal as a reflection and not LOS. Depending on the number of antennas utilized and/or positioning of the antennas relative to one another the AoA is calculated in two-dimensions or three-dimensions. For example, in the embodiment shown in FIG. 3$a$ the plurality of shielded antenna 36$a$-36$c$ are located in a horizontal plane and allow for calculation of two-dimensional AoA. In some embodiments, a 3D AoA is determined based on the 2D AoA and information regarding the location of the GNSS satellite and the antennas 36$a$-36$c$. In other embodiments, the addition of additional antennas in a vertical plane allows for calculation of a 3D AoA.

At step 70, a reflective surface is mapped based on the calculated pseudo-range of the reflected GNSS signal, the position of the satellite that originated the GNSS signal, the position estimate of the antennas based on the position estimate provided by positioning system 34, and the calculated AoA. FIG. 4$b$ illustrates the relationship utilized to determine the position of the reflective surface based on the known parameters. For example, calculation of the AoA allows the Angle of Reflectance (AoR) and Angle of Incidence (AoI) of the GNSS signal interaction with the reflective surface to be determined. The distance c from the antenna to the GNSS satellite and the satellite angle is known from the position estimate of the antenna and knowledge of the location of the satellite. The law of cosines can be utilized to determine the lengths a and b, wherein the calculated pseudo-range is equal (or approximately equal) to the sum of lengths a and b. In this way, the position of the reflective surface relative to the antenna position (i.e. position estimate provided by the positioning system 34) can be determined. The calculations illustrated in FIG. 4$b$ are provided with respect to a single antenna. As shown in FIG. 4$a$, calculations performed with respect to each of the plurality of antennas results in the generation of a mapped reflective surface whose location is known relative to the position estimate of the antenna. The geometry of the mapped reflective surface corresponds with the geometry of the plurality of antennas and/or antenna array.

At step 72, the mapped reflective surface generated at step 70 is analyzed to determine a confidence level associated with the surface. For example, in some embodiments if all the pseudo-ranges calculated by the antennas (e.g., shielded antennas 36$a$-36$c$ and/or high-precision antennas 38$a$ and 38$b$) are resolved onto a surface within a calibratable value, then a high confidence level is associated with the mapped surface. In contrast, if less than all of the pseudo-ranges calculated by the antennas can be resolved onto a surface within a calibratable value then a lower confidence level is assigned to the or the mapped surface is discarded as erroneous. In some embodiments, the calibratable value is based on one or more previously mapped surfaces from the same GNSS satellite at different epochs and/or from other GNSS satellites at the same or different epochs. For example, if mapped reflective surfaces from previous epochs (i.e., time steps) indicate a surface of a building located in a defined plane, disagreement between the current mapped reflective surface and the previously mapped surfaces decreases the confidence level associated with the current mapped surface. Likewise, disagreement between mapped reflective surfaces derived from different GNSS signals decreases the confidence level of the surfaces. Conversely, agreement between currently mapped and the previously mapped surfaces within a calibratable value increases the confidence of the currently mapped surface.

Figure 6:
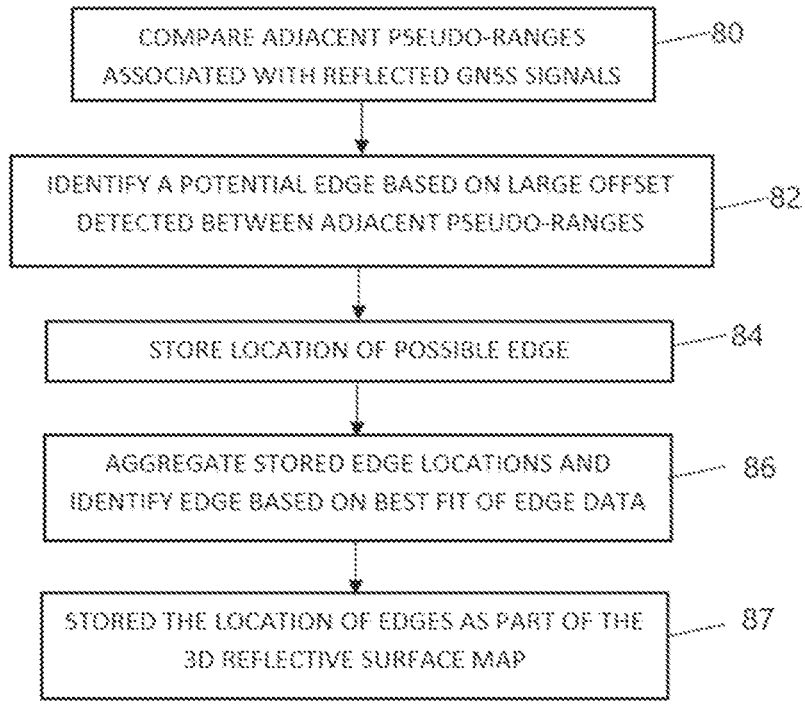
FIG. 6 is a flowchart illustrating the detection of edges in the 3D reflective surface map consistent with one or more aspects of this disclosure.
Figure 7:
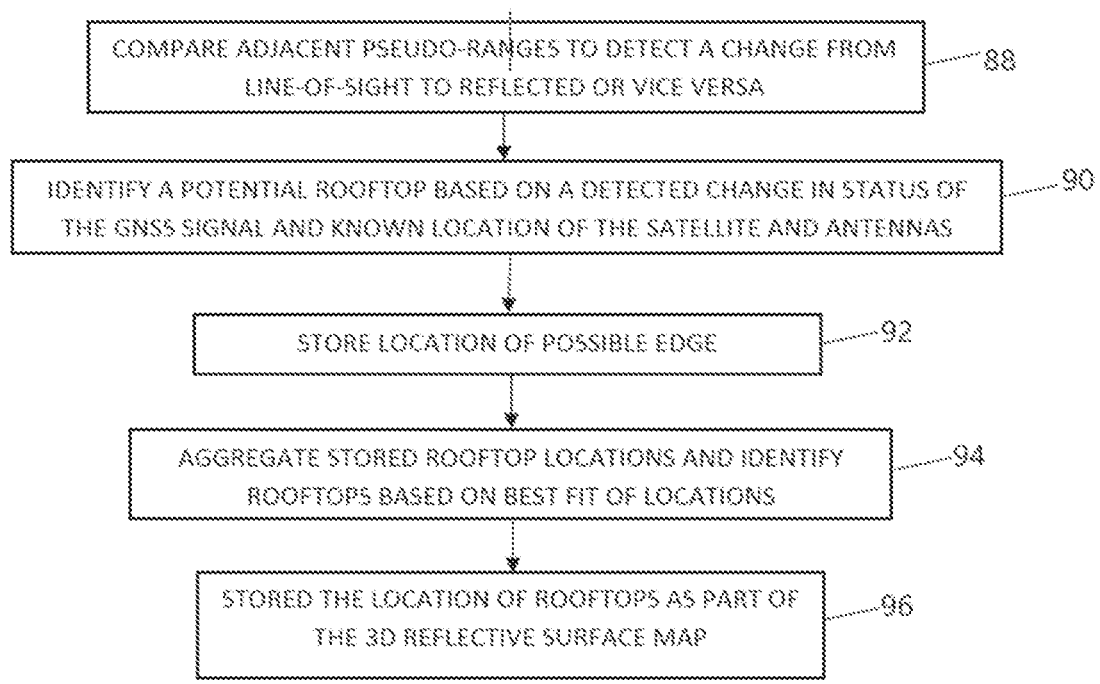
FIG. 7 is a flowchart illustrating the detection of rooftops in the 3D reflective surface map consistent with one or more aspects of this disclosure.

As discussed in more detail with respect to FIGS. 6 and 7, in instances in which one or more of the points associated with the mapped reflective surface correspond with expected values, but at least one of the point associated with the mapped reflective surface does not correspond with the expected value, the location of the non-conforming point may be identified as a potential edge. In some embodiments, this point is saved and utilized later in conjunction with other mapped reflective surfaces to detect the likely location of edges and/or rooflines associated with the buildings.

At step 74, a refractive index is assigned to the mapped reflective surface based on variance of the calculated pseudo-range of the reflections, wherein the refractive index provides information regarding the type of reflective surface. For example, a material with a lower refractive index (e.g., window pane, glass) provides a more coherently reflective surface, whereas a material with a higher refractive index (e.g., concrete) provides a less coherently reflective surface. A higher variance associated with the pseudo-ranges calculated by the plurality of antennas indicates a higher refractive index. Conversely, a lower variance associated with the pseudo-ranges calculated by the plurality of antennas indicate a lower refractive index, which results in a more coherent reflective surface. As discussed in more detail below with respect to utilizing the 3D reflective surface map to generate position fix estimates, the refractive index of the surface that reflects the GNSS signal can be utilized in some embodiments to determine the confidence level to be assigned the reflected GNSS signal, wherein a mapped reflective surface having a lower refractive index corresponds with a higher confidence level and a mapped reflective surface having a higher refractive index corresponds with a lower confidence level. In some embodiments, a region may be mapped by a plurality of received GNSS signals over a plurality of epochs, each being analyzed to determine a refractive index resulting in a plurality of refractive indexes being assigned to the same region. In some embodiments, the plurality of refractive indexes calculated for the region are averaged to provide an single assigned refractive index to the mapped surface.

At step 76, the plurality of mapped reflective surfaces and associated refractive indexes are combined to generate the 3D reflective surface map 45 (shown in FIGS. 3*a*, 3*b*). This includes aggregating mapped reflective surfaces from reflected signals corresponding to a plurality of GNSS satellites and over a plurality of epochs. In instances in which mapped surfaces generated by different reflected GNSS signals disagree, one or more sources of information may be utilized to resolve disagreements, including confidence levels associated with the mapped surfaces and/or location of adjacent surfaces. In some embodiments, the 3D map is constructed after all data has been collected to maximize the information available as opposed to during collection of the data. In addition, generating the 3D reflective surface map includes defining edges and/or rooftops associated with mapped building. As described in more detail with respect to FIGS. 6 and 7, mapped surfaces identified as potentially representing edges and/or rooftops are identified during mapping of individual surfaces and are subsequently combined to define a coherent edge/roofline. In some embodiments, a best fit is utilized to define the edge and rooftops of the building based on the plurality of mapped surfaces indicating the presence of a building edge.

At step 77, the 3D reflective surface map 45 is stored. As described in more detail with respect to FIGS. 8-12, the 3D reflective map 45 is utilized by a GNSS position fix systems to utilize reflected GNSS signals in addition with traditional LOS signals in urban canyons.

Referring now to FIG. 6, a flowchart is provided that illustrates a method of determining the location of edges based on pseudo-ranges calculated with respect to mapped reflective surfaces. For the sake of simplicity, reference is once again made to the shielded antennas 36*a*-36*c* shown in FIG. 4*a*, although it is understood that the same principles apply to other embodiments such as that shown in FIG. 4*b* utilizing a directional antenna array in place of the shielded antennas. As discussed above, shielded antennas 36*a*-36*c* allow the mapping of a plurality of reflective surfaces $50_t$, $50_{t-1}$, $50_{t-2}$, $50_{t-3}$, each mapped reflective surface defined by three points corresponding to the geometry of the three antennas 36*a*-36*c*. With respect to mapped reflective surfaces $50_t$, $50_{t-1}$ and $50_{t-2}$ each of the points associated with a mapped reflective surface corresponds approximately with the plane of the building and therefore little variation exists in calculated pseudo-ranges. However, mapped reflective surface $50_{t-3}$ is located on the edge of the building, wherein calculated pseudo-ranges place only two of the three points on the surface of the building. In this instance, the pseudo-range calculated by antennas 36*a* and 36*c* with respect to the points located on the building likely correspond approximately with the expected location of the building. However, the pseudo-range calculated with respect to antenna 36*b* will likely vary from the first two pseudo-ranges substantially and is therefore identified as representing a potential edge location. The flowchart provided with respect to FIG. 6 illustrates a method of utilizing this information to detect the edges of building in the 3D surface map.

At step 80 pseudo-ranges calculated for each GNSS signal measured at each of the plurality of antennas (e.g., 36*a*-36*c*)—each constituting a point on the mapped reflective surface—are compared to one another. In some embodiments the comparison of pseudo-ranges is performed prior to mapping of the reflective surface. In other embodiments, the comparison of pseudo-ranges is performed as part of the mapping of the reflective surface. At step 82, a potential edge is identified based on a large offset in pseudo-ranges calculated between pseudo-ranges associated with the mapped surface. In some embodiments, a threshold distance is utilized (e.g., 3 m) to determine whether the offset is sufficient to constitute a potential edge. In some embodiments, a potential edge is identified based on a large offset in pseudo-ranges calculated at a particular epoch with respect to one another. For example, in the embodiment shown in FIG. 4*a* the reflective surface $50_{t-3}$ would include two points—corresponding with shielded antennas 36*a* and 36*c*—that are mapped to the surface of the building while a third point—corresponding with shielded antenna 36*c*—is not mapped to the surface of the building and therefore would provide a pseudo-range having a large offset relative to the other two points. In some embodiments, in addition to comparing pseudo-ranges calculated at a particular epoch, pseudo-ranges from a plurality of epochs may be compared to one another to detect large offsets. For example, in the embodiment shown in FIG. 4a, large offsets may be detected between pseudo-ranges calculated with respect to the surface mapped at time t−3 and pseudo-ranges calculated with respect to the surface mapped at time t−4 (not shown).

At step 84, the location of the potential edge is stored. In some embodiments, this includes storing the point corresponding with the mapped surface that indicated a large offset in pseudo-ranges and identifying the point as a potential edge. In other embodiments, a point is estimates at a location between the points (e.g., halfway) that include the large offset based on the assumption that the edge is located somewhere between the respective points.

At step 86, the stored points identified as defining a potential edge are aggregated to define the edge of the building. Various methods may be utilized to define the edge of the building based on the plurality of stored points and various assumptions may be made regarding the edges of building (e.g., the building edge is straight and generally the edges of planes are either parallel or perpendicular to the surface of the earth). For example, in some embodiments a best fit algorithm is utilized to define the edge of the building based on the plurality of stored points from a plurality of reflected GNSS signals over a plurality of epochs. At step 87, defined edges are stored as part of the 3D reflective surface map.

Referring now to FIG. 7, a flowchart is provided that illustrates a method of determining the location of rooftops based on a detected change in stats of received signal from line-of-sight (LOS) to reflection or vice versa. In some embodiments, the method provided with respect to FIG. 6 may be extended to detecting rooftops. However, GNSS signals reflected near the top of a building may oscillate between being a LOS signal and reflected signal. In some embodiments, this change in states from LOS to reflected (or vice versa) may be utilized to detect the edge of a rooftop. This is also one of the reasons why it is desirable not to filter all of the LOS GNSS signals, to allow the detection of signal transitioning from LOS to reflected and vice versa.

At step 88 adjacent pseudo-ranges calculated based on received GNSS signals are utilized to detect a change in status from LOS to reflection. As described previously with respect to step 66 in FIG. 5, calculated pseudo-ranges are compared to expected pseudo-ranges derived from the position estimate of the antenna to determine whether the received GNSS signal is LOS or a reflection. In some embodiments, the GNSS signal is identified as LOS if the difference between the expected pseudo-range (known from the position estimate of the antenna and the known location of the satellite) and the calculated pseudo-range is less than a threshold (e.g., 3 meters). Conversely, if greater than the threshold the GNSS signal is identified as a reflection. In some embodiments, detecting a change in status from LOS to reflection can be done at approximately the same time pseudo-ranges are being utilized to identify reflections. In some embodiments, however, the comparison of adjacent pseudo-ranges includes both pseudo-ranges calculated during the same epoch by each of the plurality of antennas (e.g., shielded antennas 36a-36c) as well as pseudo-ranges calculated by each of the plurality of antennas during different epochs. In some instances, the epochs may be adjacent in time.

At step 90, a potential rooftop is identified based on the change in status in a GNSS signal from LOS to reflected (or vice versa) based on the comparison of calculated pseudo-ranges to expected LOS pseudo-ranges. At step 92, the location of the potential rooftop is stored. In some embodiments, the location stored as a potential rooftop edge may be the position associated with the pseudo-range identified as having a changed status as compared with adjacent pseudo-ranges. In some embodiments, the location stored as a potential rooftop edge may be a position selected between the location of points identified as changing state from reflection to LOS or vice versa. That is, identification of the rooftop by a change in status of received GNSS signals implies that the rooftop is located at some point between the location associated with a reflected GNSS signal and a LOS GNSS signal.

At step 94, the stored points identified as defining a potential rooftop are aggregated to define the rooftop of the building. Various methods may be utilized to define the rooftop of the building based on the plurality of stored points and various assumptions may be made regarding the rooftop (e.g., the rooftop is straight). For example, in some embodiments a best fit algorithm is utilized to define the rooftop of the building based on the plurality of stored points. At step 96, defined rooftops are stored as part of the 3D reflective surface map.

Figure 8:
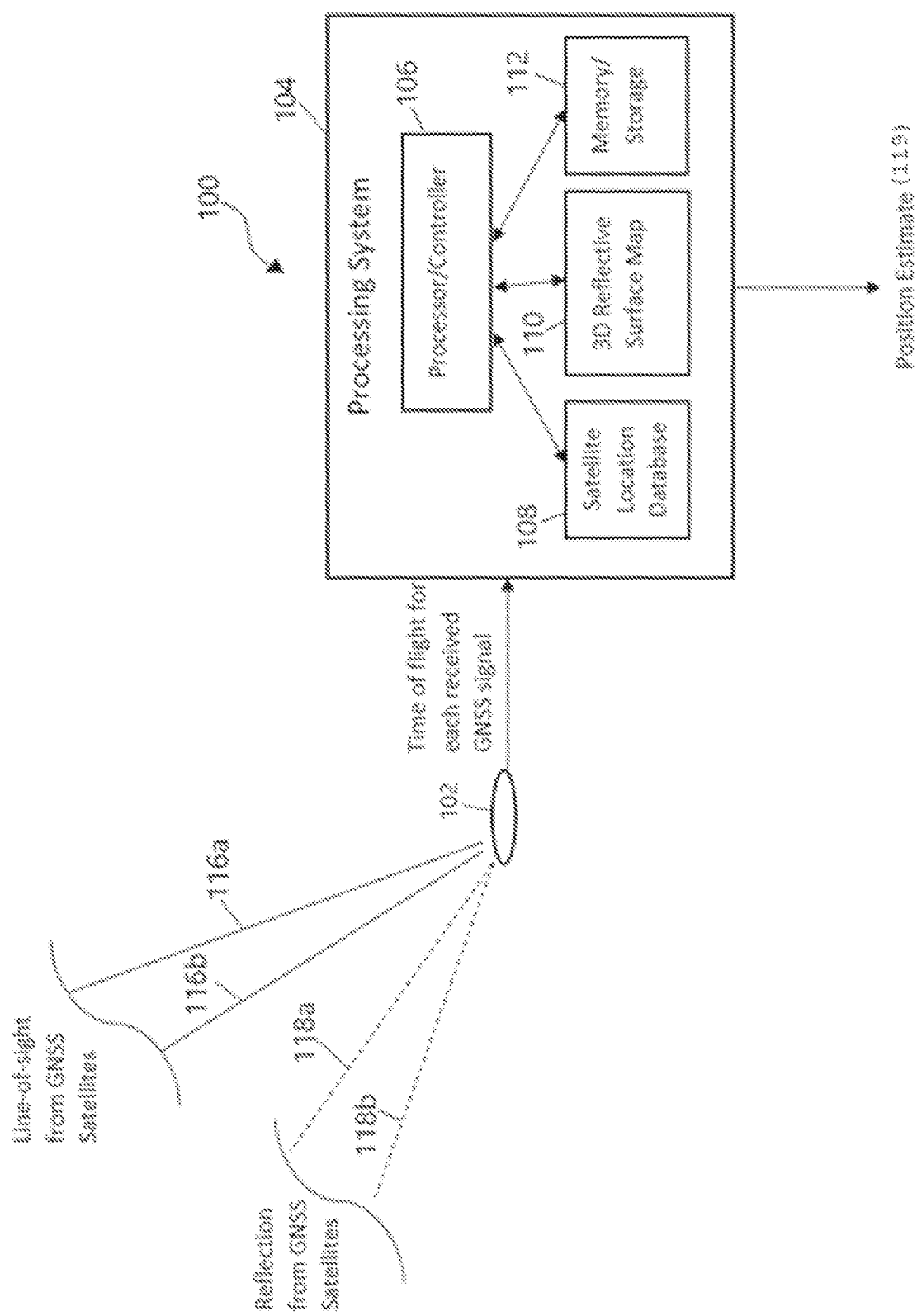
FIG. 8 is a schematic diagram of a GNSS receiver system that utilizes a 3D reflective surface map consistent with one or more aspects of this disclosure.
Figure 9:
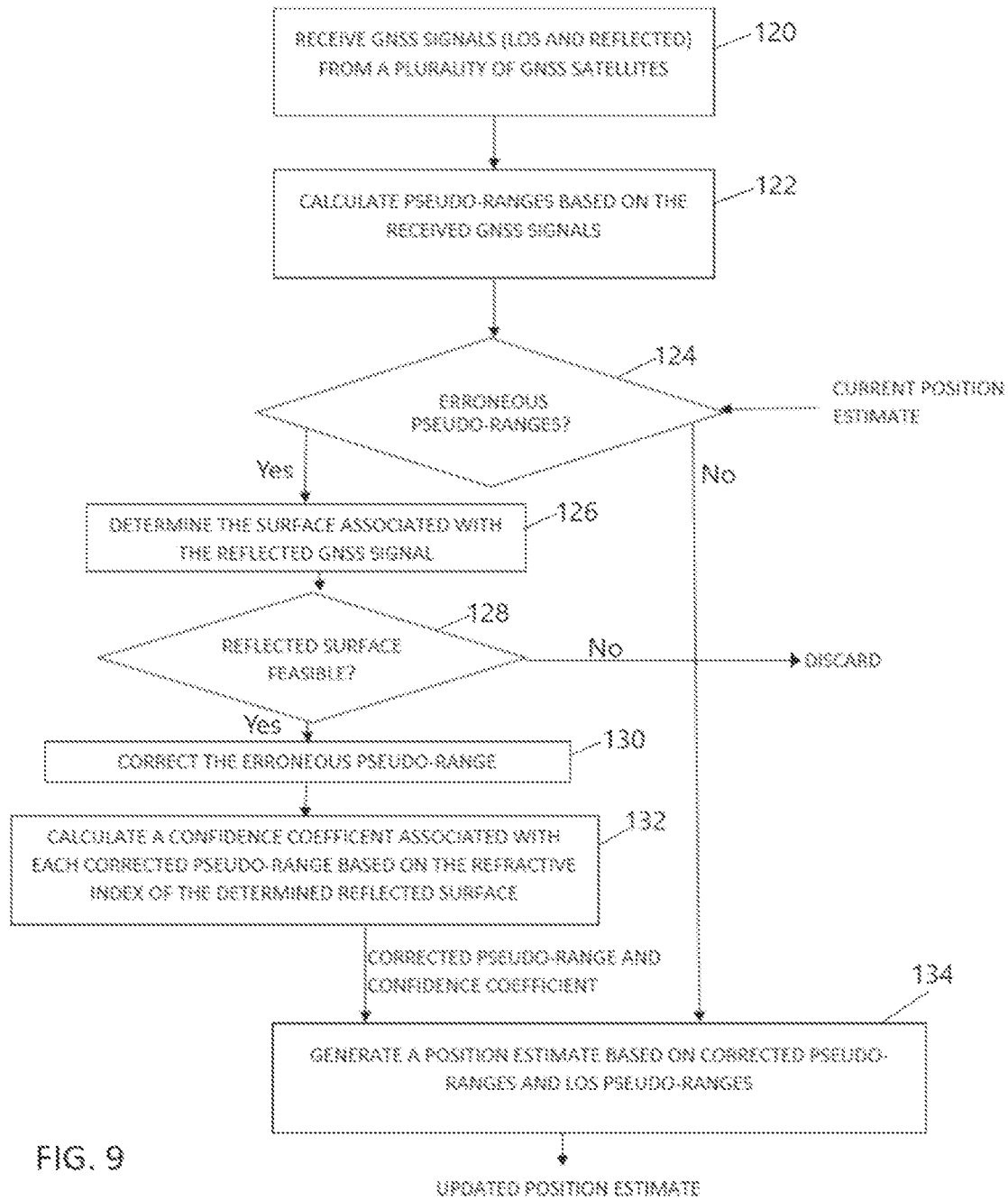
FIG. 9 is a flowchart illustrating the calculation of pseudo-ranges, detection and correction of erroneous pseudo-ranges, and position fix estimation based on received GNSS signals consistent with one or more aspects of this disclosure.

Referring to FIGS. 8 and 9, a system and method of determining position estimates utilizing both line-of-sight and reflected GNSS signals in combination with the 3D reflective surface map is provided. In particular, FIG. 8 is a block diagram illustrating GNSS position fix system 100 that includes a GNSS antenna/receiver 102 and a processing system 104 for determining a position estimate or fix 119 based on received GNSS signals—both LOS GNSS signals 116a, 116b and reflected GNSS signals 118a, 118b. FIG. 9 is a flowchart illustrating steps performed by the GNSS position fix system 100 to generate an accurate position fix.

In the embodiment shown in FIG. 8, a single GNSS antenna/receiver 102 is illustrated, but in other embodiments two or more GNSS antennas (e.g., dual antenna) may be utilized. In some embodiments, antenna 102 receives GNSS signals (e.g., LOS GNSS signals 116a, 116b and/or reflected GNSS signals 118a, 118b) that includes identification of the satellite from which the GNSS signal originated as well as a time-of-flight associated with each received GNSS signal. In some embodiments, the raw data is provided directly to processing system 104. In other embodiments, GNSS antenna/receiver 102 calculates a pseudo-range for each received GNSS signal calculated based on the known location of the GNSS satellite that originated the signal and the time-of-flight of the GNSS signal and provides the calculated pseudo-range to the processing system 104.

In some embodiments, processing system 104 includes processor/controller 106, satellite location database 108, stored 3D reflective surface map 110, and memory/storage 112. In some embodiments, processing system 104 is positioned locally relative to GNSS antenna/receiver 102 (e.g., on the same vehicle, handheld device, and/or mobile device that houses the antenna/receiver 102). In other embodiments, processing system 104 is located remotely relative to GNSS antenna/receiver 102 (e.g., remote server, cloud-based server, etc.), wherein GNSS data (e.g., pseudo-range) is communicated via wireless communication to the processing system 104, and the processing system generates a position fix 119 that is communicated back to the device housing the GNSS antenna/receiver 102 (e.g., vehicle, handheld device, and/or mobile device) to be displayed to a user.

Processor/controller 106 executes instructions stored on memory/storage 112 to implement the method described herein to generate a position fix estimate 119 based on the received GNSS signals, a satellite location database 108, and a stored 3D reflective surface map 110.

In a typical GNSS position fix system, an antenna receives GNSS signals from a plurality of GNSS satellites and determines from the received GNSS signal a pseudo-range or distance from the antenna to the GNSS satellite that originated the signal. Assuming the GNSS signals received by the antenna are all LOS (e.g., LOS GNSS signals 116a, 116b), the position of the antenna can be determined based on the calculated distance or pseudo-range from the antenna to each of the GNSS satellites. When the antenna is in an urban canyon one or more of the GNSS signals may be obstructed by buildings. However, due to the low refractive index of many building surfaces a GNSS signal may be reflected (e.g., reflected GNSS signals 118a, 118b) and then received by the GNSS antenna/receiver 102. Pseudo-ranges calculated based on the reflected GNSS signal will be inaccurate due to the additional time-of-flight associated with the path length of the reflection. In some embodiments, processing system 104 receives the pseudo-ranges calculated based on the received GNSS signals—LOS (116a, 116b) and reflected (118a, 118b)—and utilizes the stored 3D reflective surface map 110 to extract useful positional information from the reflected GNSS signals. In this way, the portion of the sky available to provide useful GNSS information is expanded.

With reference to FIG. 9, at step 120 GNSS signals are received from a plurality of GNSS satellites, including both LOS GNSS signals 116a, 116b and reflected GNSS signals 118a, 118b (shown in FIG. 8). At step 122, pseudo-ranges are calculated based on each received GNSS signal. In some embodiments, pseudo-ranges are calculated by the GNSS antenna/receiver 102, while in other embodiments the processing system 104 calculates the pseudo ranges based on the received GNSS data. In a typical system, with no way to determine whether a GNSS signal is LOS or reflected, the pseudo-ranges calculated with respect to both LOS and reflected GNSS signals are treated as accurate, resulting in large distortions between the ground-truth location of the antenna and the GNSS position fix.

At step 124, the calculated pseudo-ranges are compared to a current and/or predicted position fix estimate to identify erroneous pseudo-ranges, wherein erroneous pseudo-ranges are indicative of a reflected signal. In some embodiments, the current position fix estimate represents the previously calculated position fix estimate generated based on a previously received GNSS signals. In other embodiments, a predicted position fix estimate may incorporate motion information (e.g., current position fix, direction, velocity, etc.) of the GNSS antenna/receiver 102 to generate a predicted position fix estimate. For example, if the antenna is previously determined to be moving in a particular direction at a particular speed, the predicted position fix may incorporate the direction/speed information to estimate the location of the antenna during the next GNSS update.

In some embodiments, pseudo-ranges are identified as erroneous if the difference between the expected pseudo-range (based on the current and/or predicted position estimate and known location of the GNSS satellite) and the calculated pseudo-range is greater than a threshold value (e.g., 3 meters). In some embodiments, either alone or in conjunction with the comparison of expected pseudo-ranges with calculated pseudo-ranges, the calculated pseudo-ranges are compared to one another and/or to calculated pseudo-ranges associated with previous epochs. For example, if a calculated pseudo-range associated with a particular LOS satellite changes dramatically from one measurement to the next either in comparison to itself and/or other pseudo-ranges, this is an indication that the status of the GNSS signal has changed from LOS to reflected. For those pseudo-ranges determined to be accurate (i.e., not erroneous), they are identified as likely LOS and therefore the calculated pseudo-range does not require correction. For those pseudo-ranges determined to be erroneous, the GNSS signal is likely a reflection. In the embodiment shown in FIG. 9, pseudo-ranges determined to be accurate are provided to step 134 for subsequent processing while those pseudo-ranges determined to be erroneous are corrected via steps 126-132.

Figure 10:
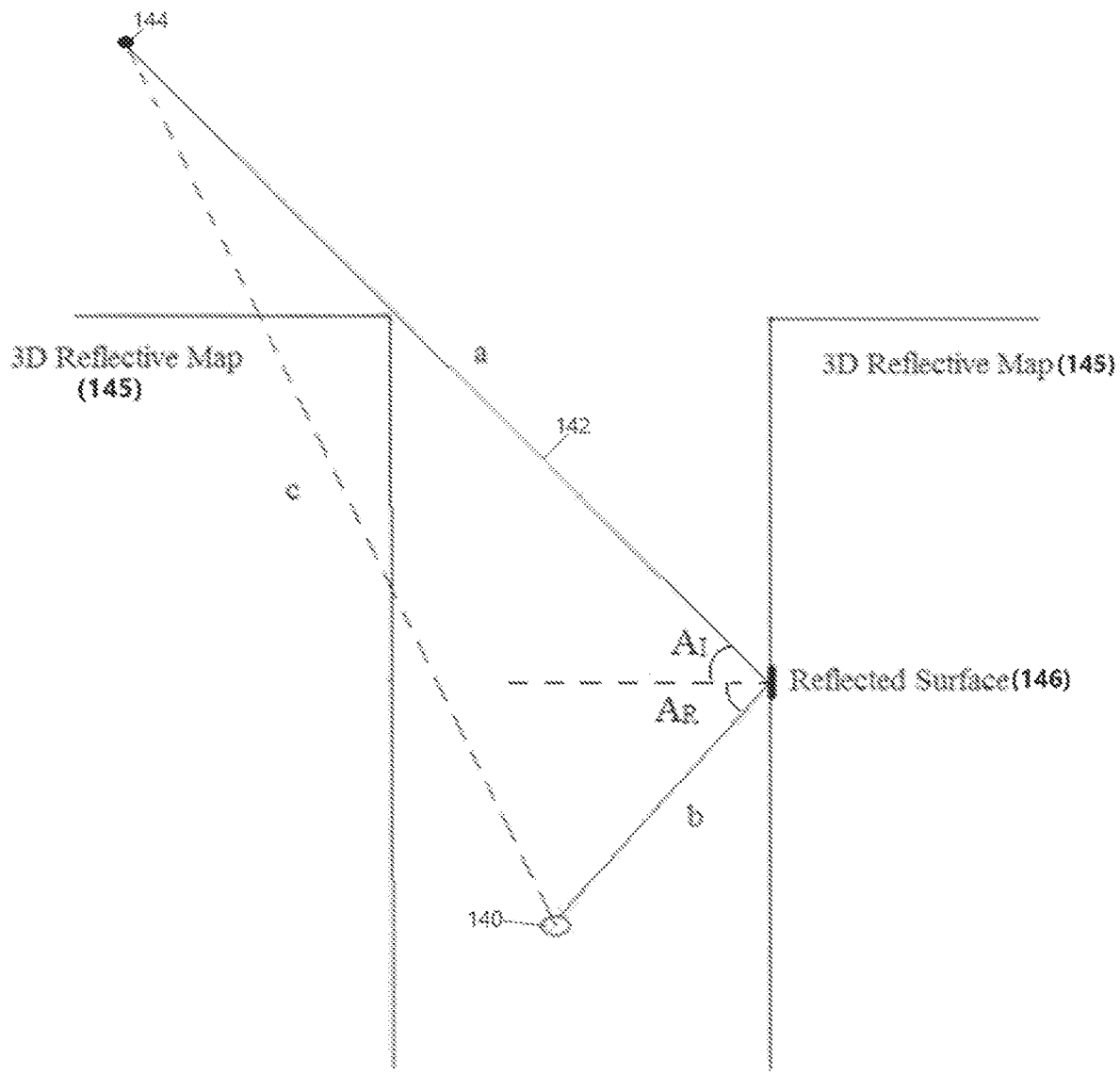
FIG. 10 is a diagram illustrating identification of the reflected surface associated with a reflected GNSS system and correction of the calculated pseudo-range consistent with one or more aspects of this disclosure.

At step 126, the surface that reflected the GNSS signal is determined within the 3D reflective surface map. In some embodiments, the reflective surface is identified based on the current position estimate of antenna, the location of the GNSS satellite, and the 3D reflective surface map. For example, FIG. 10 illustrates the reception at antenna 140 of a reflected GNSS signal 142 from GNSS satellite 144. Based on knowledge of the location of antenna 140, the location of the GNSS satellite 144, and the location of reflective surfaces provided by the 3D reflective surface map 145—along with the assumption that the angle-of-incidence ($A_I$) equal the angle-of-reflection ($A_R$), a surface 146 is identified that is responsible for reflecting the GNSS signal 142 to the antenna 140.

In some embodiments, at step 128, a determination is made regarding whether the reflective surface 146 identified at step 126 is plausible. In some embodiments, verification is based on comparison of the calculated pseudo-range to the pseudo-range that would result based on the identified reflective surface 146. For example, with reference to FIG. 10, the calculated pseudo-range based on the reflected GNSS signal 142 is equal to the sum of distances 'a' and 'b'. Based on the current position estimate of antenna 140, the location of GNSS satellite 144, and the location of the reflective surface 146, the calculated pseudo-range can be compared to the sum of distances 'a' and 'b' to determine if the reflective surface represents a plausible solution. For example, in some instances the GNSS reflection may include several reflections resulting in a calculated pseudo-range that is longer than predicted. This would indicate that the selection of the reflective surface 146 was erroneous and should therefore be discarded. In some embodiments, a difference between the calculated pseudo-range and the sum of distances 'a' and 'b' is compared to a threshold value, wherein if the difference is greater than a threshold the reflective surface is determined to be non-plausible and is discarded. If the reflective surface is determined to be plausible, then the process continues at step 130.

At step 130, the erroneous pseudo-range is corrected. With reference once again to FIG. 10, the distance 'c' represents the corrected pseudo range. Based on the calculated pseudo-range (represented as the sum of distances 'a' and 'b') and the identified location of the reflective surface 146 the distance 'c' can be calculated. In some embodiments, the estimated location of the antenna 140 is utilized in combination with the identified reflective surface 146 to determine the distance 'b', and the location of the GNSS satellite 144 and the identified reflective surface 146 is utilized to determine the distance 'a'. The angle of incidence $A_I$ and the angle of reflection $A_R$ are summed and utilized in combination with the distance 'a' and 'b' to determine the corrected pseudo-range 'c'. For example, in one embodiment the law of cosines is utilized to calculate 'c', wherein the law of cosines is expressed as:

$$c^2 = a^2 + b^2 - 2ac\cos(A_I + A_R)$$

In some embodiments, at step 132 a confidence coefficient is calculated based on the identified location of the reflective surface 146. As discussed with respect to FIG. 2, the 3D reflective surface map 20 may include in addition to the location of the 3D surfaces, a refractive index that characterizes the reflectivity of the surface, wherein 3D surfaces identified as having a low refractive index (e.g., specular reflection) are characterized as more reliable than a 3D surface identified as having a high refractive index (e.g., diffuse reflection).

At step 134 a position fix estimate 119 is generated based on calculated pseudo-ranges, including both the pseudo-ranges calculated from LOS GNSS signals and the corrected pseudo-ranges calculated from reflected GNSS signals. In some embodiments the corrected pseudo-ranges—based on reflected GNSS signals—are given the same weight as the pseudo-ranges calculated based on LOS GNSS signals. In other embodiments, the reflected GNSS signals are weighted according to the confidence coefficient calculated with respect to each corrected pseudo-range. In some embodiments, a maximum confidence coefficient associated with the corrected pseudo-range results in the corrected pseudo-range being given the same weight as a LOS GNSS signal. Decreases in the confidence coefficient associated with the corrected pseudo-ranges result in less weight being given to the corrected pseudo-range coefficient. The position fix estimate based on the calculated pseudo-ranges is provided as an output. In embodiments in which the processing system 104 is located locally relative to the GNSS antenna/receiver 102 that receives the GNSS system, then the processing system 104 may display the results to a user. In embodiments in which the processing system 104 is located remotely relative to the GNSS antenna/receiver 102, the processing system 104 communicates the position fix estimate via wireless communication means to the device housing the GNSS antenna/receiver 102 (e.g., vehicle, handheld device, and/or mobile device) for display to the user or for usage in other applications.

Figure 11:
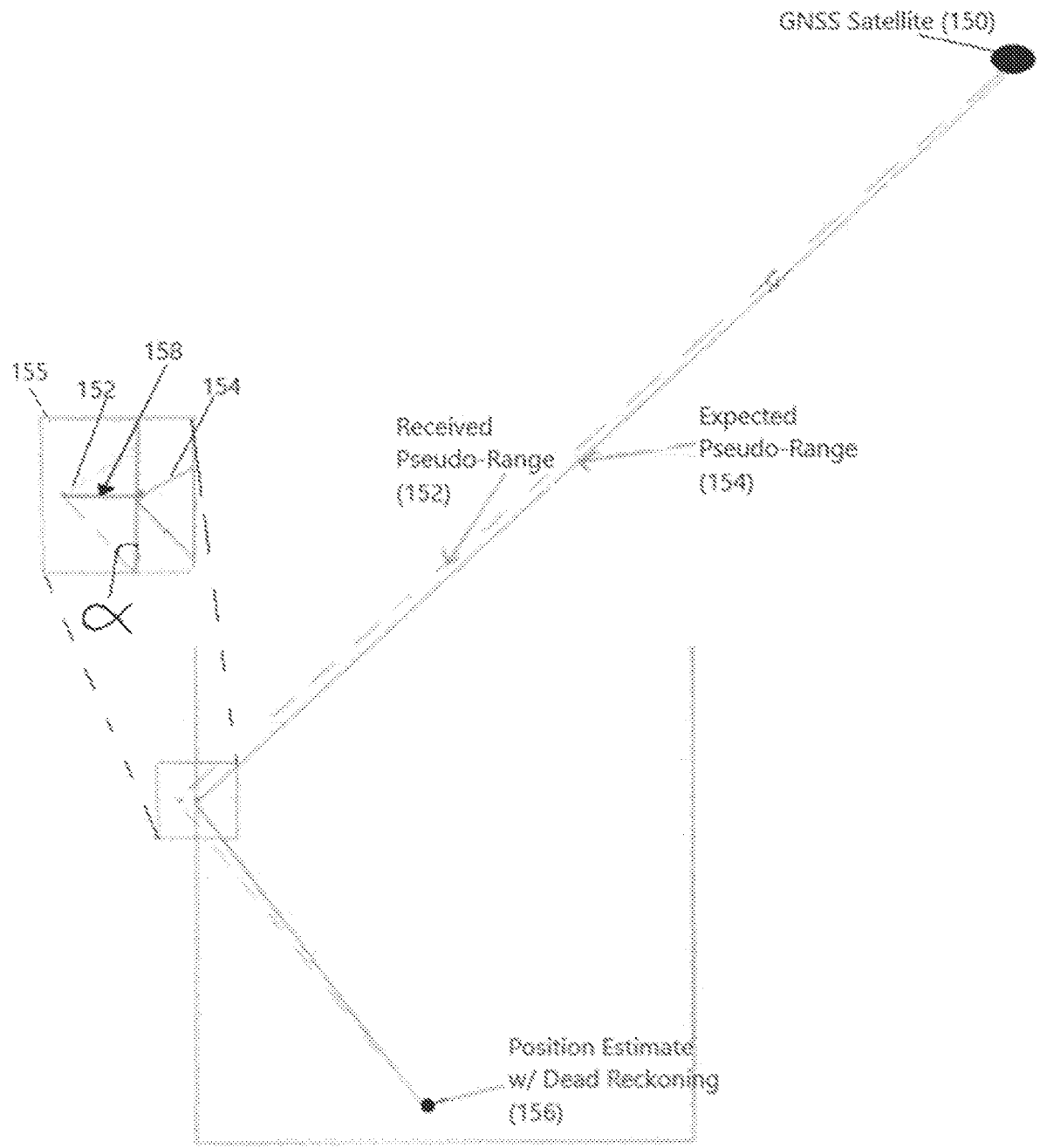
FIG. 11 is a diagram illustrating detection and correction of positional variance consistent with one or more aspects of this disclosure.

FIG. 11 is a diagram illustrating detection and correction of positional variance consistent with one or more aspects of this disclosure. In some instances, ionospheric and/or tropospheric conditions may change the speed at which GNSS signals travel and therefore the time-of-flight of the GNSS signal. As a result of the ionospheric and/or tropospheric conditions, errors may be introduced into the position fix estimate. According to one or more aspects, the effects of the error introduced by the ionospheric and/or tropospheric conditions are removed to provide an improved position estimate. In some embodiments, the GNSS position fix system 100 shown in FIG. 8 would further include an inertial measurement unit (IMU) and/or other device utilized to augment the GNSS position fix estimate with a dead reckoning positional estimate (i.e., modification of the GNSS position fix based on a previous position fix estimate and direction/speed/acceleration information provided by the IMU and/or other devices.

Figure 12:
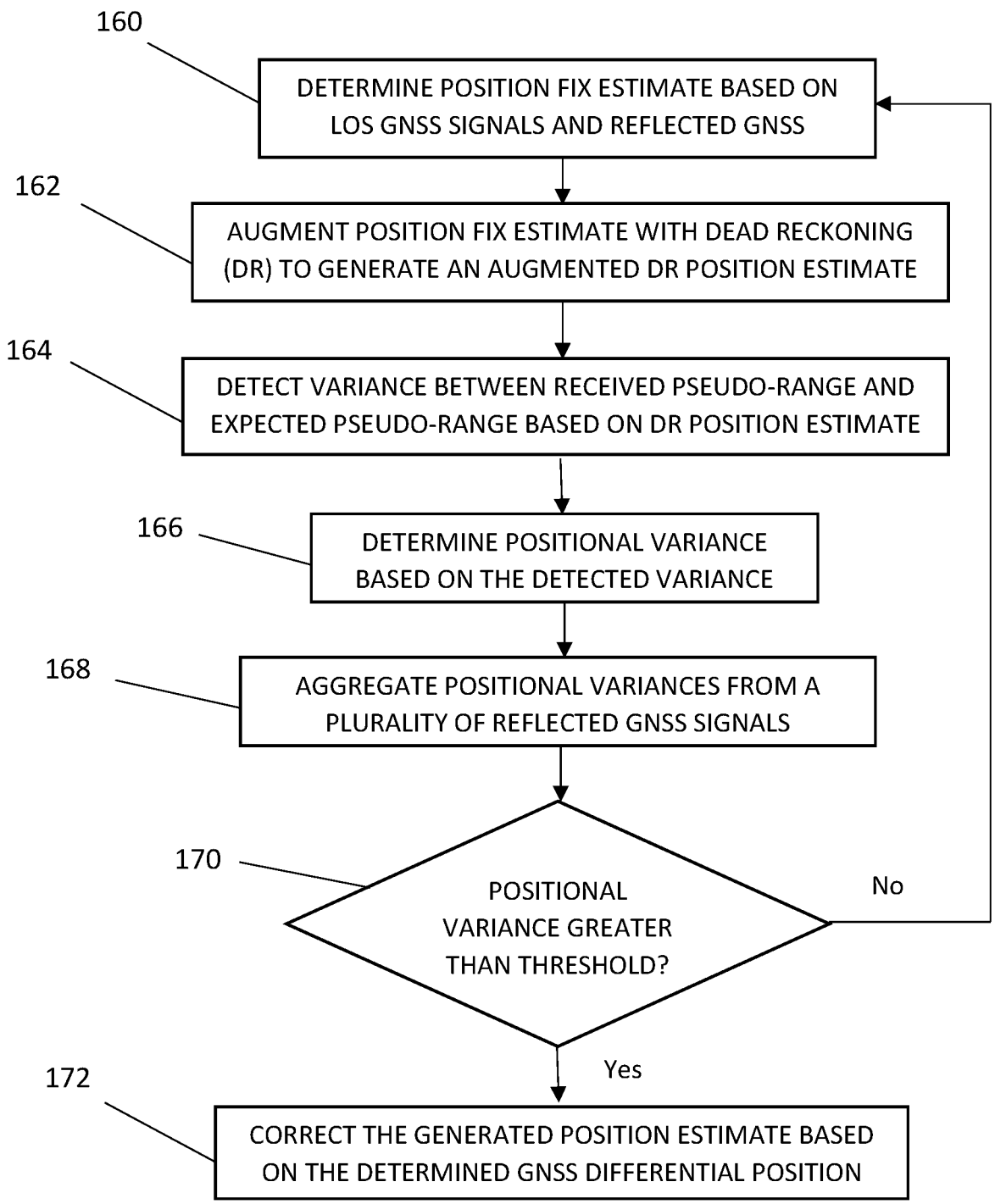
FIG. 12 is a flowchart illustrating the detection and correction of positional variance consistent with one or more aspects of this disclosure.

FIG. 12 is a flowchart illustrating steps utilized to detect and correct positional variance consistent with one or more aspects of this disclosure. At step 160, a position fix estimate is determined based on the LOS GNSS signals and reflected GNSS signals as described above with respect to FIGS. 8-10. At step 162, the position fix estimate is augmented with a dead-reckoning (DR) estimate. In some embodiments, dead-reckoning is based on direction and speed of the GNSS position fix system 100. For example, in some embodiments the GNSS position fix system 100 includes an inertial measurement unit (IMU) that provides direction/speed information associated with the GNSS position fix system 100.

At step 164, variance is detected between the received pseudo-range 152 (i.e., the pseudo-range calculated with respect to the reflected GNSS signal, as shown in FIG. 11) and the expected pseudo-range 154 (i.e., the pseudo-range expected based on the augmented DR position estimate, as shown in FIG. 11). In some instances, ionospheric and/or tropospheric conditions increase the received pseudo-range 152 due to the signal traveling more slowly than anticipated through the atmosphere.

At step 166, the difference between the received pseudo-range 152 and the expected pseudo-range 154 is utilized to calculate the positional variance 158 (illustrated in FIG. 11). For example, in one embodiment the positional variance 158 is calculated using the following equation:

$$\text{Detected Positional Variance} = \sin(\alpha) \cdot (\tfrac{1}{2})\Delta\text{Pseudorange}$$

wherein α is the Angle of Arrival (labeled in FIG. 11), and ΔPseudorange is the difference between the received pseudo-range 152 and the expected pseudo-range 154.

At step 168, positional variances from a plurality of reflected GNSS signals are combined. Positional variances may be combined to generate a single aggregated value (e.g., average), or may be combined based on the angle of arrival associated with the received pseudo-range. For example, in one embodiment the combined positional variance is represented as an average of all positional variances regardless of the angle of arrival. In other embodiments, the positional variances are combined based on the determined AoA of the reflected GNSS signal. For example, positional variances associated with reflections received from the left side of the antenna (for example, as shown in FIG. 11) may be combined with positional variances associated with other reflections received from the left side of the antenna. Similarly, positional variances associated with reflections received from the right side of the antenna may be combined with one another. In some embodiments, the combined positional variance may be represented as an average of the positional variance associated with reflected GNSS signals received from a particular direction. The combination of positional variances may include averaging, fuzzy logic, etc.

In some embodiments, at step 170 the positional variance is compared to a threshold value to determine whether to correct the generated position estimate. In some embodiments, correction of the positional variance may be provided at every epoch. In other embodiments the positional variance may be corrected only after the positional variance is determined to be greater than a threshold value. In some embodiments, if the positional variance is less than the threshold value then the process continues at step 160. If the positional variance is greater than the threshold value then the positional variance is corrected at step 172.

At step 172, the position fix estimate is updated to correct for the positional variance. In some embodiments, the correction provided to the position fix update is based on the magnitude of the positional variance. In some embodiments, the positional variance associated with various AoA (e.g., positional variance associated with AoA from left side v. positional variance associated with AoA from the right side) are combined to determine the magnitude and direction of the update to the position fix estimate. For example, in the embodiment shown in FIG. 11, the correction for positional variance will move the position estimate of the antenna to the right. As a result of the correction, the received pseudo-range in subsequent measurements is approximately equal to the expected pseudo-range.

Figure 13:
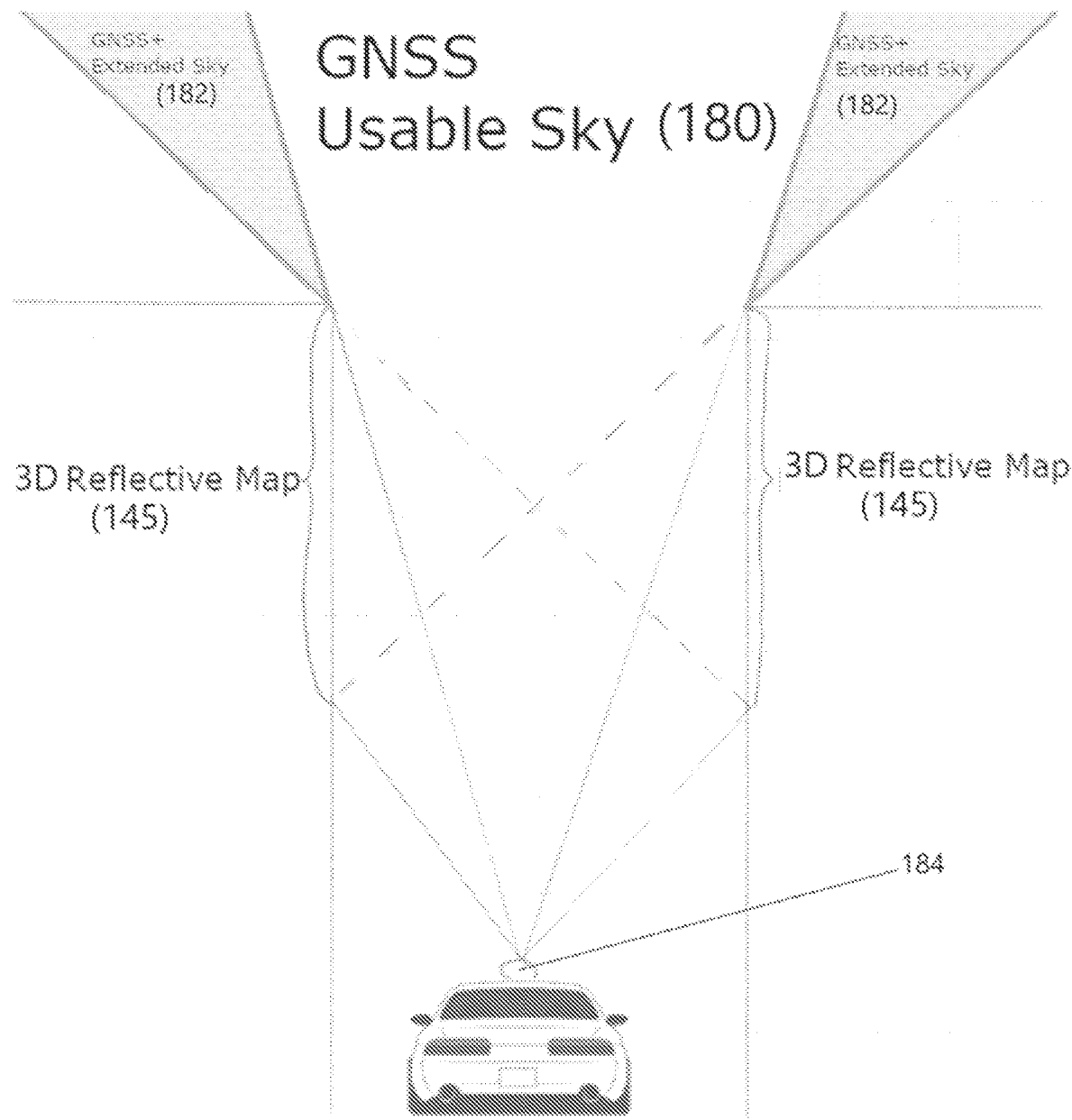
FIG. 13 is a diagram illustrating the expansion of usable portion of the sky based on utilization of reflected GNSS signals in generating position fix estimates consistent with one or more aspects of this disclosure.

FIG. 13 is a diagram illustrating the expansion of usable portion of the sky based on utilization of reflected GNSS signals in generating position fix estimates consistent with one or more aspects of this disclosure. The sky is divided into GNSS LOS portion of the sky 180 and GNSS expanded portion of the sky 182. Utilization of the 3D reflective surface map allows reflections to be utilized in GNSS position fix estimate, expanding the usable sky as illustrated in FIG. 13.

In this way, this disclosure provides a system and method of generating a 3D reflective surface map and further provides a system and method of utilizing a 3D reflective surface map to generate positional estimates, wherein the 3D reflective surface map allows reflected GNSS signals to be utilized as well as line-of-sight (LOS) GNSS signals.

Discussion of Possible Embodiments

The following are non-exclusive descriptions of possible embodiments of the present invention.

According to one aspect, a system for generating a 3D reflective surface map includes a positioning system, one or more antennas co-located with the positioning system, and a processing system. The positioning system calculates a position estimate. The one or more antennas are configured to receive at least one reflected global navigation satellite system (GNSS) signal associated with a respective GNSS satellite and wherein a pseudo-range to the GNSS satellite is determined based on the reflected GNSS signal. The processing system is configured to receive the position estimate and the pseudo-ranges calculated with respect to each reflected GNSS signal, wherein the processing system maps a reflective surface based on the calculated pseudo-range provided by the reflected GNSS signals, the position estimate, Angle-of-Arrival of each reflected GNSS signal, and known satellite location of each respective GNSS satellite.

The system of the preceding paragraph can optionally include, additionally and/or alternatively any one or more of the following features, configurations and/or additional components.

For example, the processing system may combine the reflective surfaces mapped over a plurality of time to construct a 3D map of surfaces.

The one or more antennas may include at least a first shielded antenna and a second shielded antenna, wherein the first and second shielded antennas are located a known distance from one another.

The processing system may determine the angle-of-arrival (AoA) of a reflected GNSS signal based, at least in part, on a comparison of a first pseudo-range calculated by the first shielded antenna with a second pseudo-range calculated by the second shielded antenna.

The processing system may calculate a refractive index for each mapped reflective surface based on variance between the pseudo-ranges calculated by the first shielded antenna and the second shielded antenna and stores the refractive index as part of the 3D reflective surface map.

The processing system may detect an edge based on a detected offset in a first pseudo-range and a second pseudo-range.

The processing system may detect a rooftop edge based on detected change in status of a GNSS signal from a reflected signal to a line-of-sight (LOS) signal or from a LOS signal to a reflected signal.

The one or more antennas may include an antenna array comprised of a plurality of antennas configured to operate as a directional antenna.

In another aspect, a system for calculating position estimates includes a GNSS antenna/receiver and a processor system. The GNSS antenna/receiver is configured to receive GNSS signals from a plurality of satellites and to calculate a pseudo-range for each received GNSS signal, wherein GNSS signals include both line-of-sight GNSS signals and reflected GNSS signals. The processor system includes a processor, a satellite location database, and a 3D reflective surface map of a surrounding area. The processor system detects erroneous pseudo-ranges based on a current position estimate and corrects erroneous pseudo-ranges based on the 3D reflective surface map, the current position estimate, and satellite location retrieved from the satellite location database. The processor system calculates an updated position estimate based on the pseudo-ranges collected from LOS GNSS signals and corrected pseudo-ranges.

The system of the preceding paragraph can optionally include, additionally and/or alternatively any, one or more of the following features, configurations and/or additional components.

For example, the 3D reflective surface map may be sub-divided into a plurality of individual regions, wherein each individual region is assigned a refractive index.

The processor system may calculate the individual region intersected by the reflected GNSS signal based on the current position estimate, the 3D reflective surface map, and the known location of the satellite.

The processor system may calculate a confidence level associated with the corrected pseudo-range calculated for a reflected GNSS signal based at least in part on the refractive index assigned the individual region intersected by the reflected GNSS signal.

The processor system may detect a variance in the corrected pseudo-ranges associated with the reflected GNSS signals, wherein the processor system corrects the updated position estimate based on the detected variance and knowledge regarding the position of the satellites associate with the reflected GNSS signals.

According to another aspect, a method of processing global navigation satellite system (GNSS) signals received from a plurality of GNSS satellites to determine position includes calculating for each GNSS signal received a pseudo-range that estimates a distance between a local antenna and the GNSS satellite that generated the GNSS signal. The method further includes detecting erroneous pseudo range based at least in part on comparisons of each calculated pseudo-ranges with a current position estimate. Based on information regarding a location of the GNSS satellite that generated the GNSS signal, a current position estimate, and a 3D reflective surface map of surrounding 3D objects, a surface that reflected the GNSS signal is determined. The erroneous pseudo-range is corrected based on the location of the GNSS satellite, the location of the surface that reflected the GNSS signal, and the current position estimate. An updated position estimate is generated based on the calculated pseudo-ranges and the corrected pseudo-ranges.

The method of the preceding paragraph can optionally include, additionally and/or alternatively any, one or more of the following features, configurations and/or additional components.

For example, detecting erroneous pseudo-ranges may include comparing the calculated pseudo-range with previously calculated pseudo-ranges to detect large changes indicative of a change in status from a line-of-sight signal to a reflected signal.

The 3D reflective surface map may further include a refractive index assigned to each mapped surface.

Correcting the erroneous pseudo range may further include generating a confidence coefficient based on the refractive index assigned to the surface that reflected the GNSS signal.

The refractive index assigned to each mapped surface is assigned a higher refractive index to indicate a more reflective surface.

The method may further include augmenting the current position estimate with outputs from an inertial measurement unit (IMU) to provide a dead reckoning position estimate and detecting a variance between the received pseudo-range and an expected pseudo-range based on the dead reckoning position estimate. A positional variance is calculated between the received pseudo range and the expected pseudo-range, and the positional variance is utilized to adjust the current position estimate.

The positional variance may be compared with a threshold value, wherein the positional variance is corrected in response to the positional variance being greater than the threshold value.

The invention claimed is:

1. A system for calculating position estimates, the system comprising:
   a GNSS antenna/receiver configured to receive GNSS signals from one or more GNSS satellites; and
   a processor system that includes a processor, a satellite location database, and a 3D reflective surface map of a surrounding area, wherein the processor system identifies GNSS signals reflected from an object and utilizes the reflected GNSS signal in combination with the satellite location database and the 3D reflective surface map to determine a position estimate of the GNSS antenna/receiver,
   wherein the 3D reflective surface map further includes a refractive index assigned to each mapped surface and the processor system is configured to determine the position estimate of the GNSS antenna/receiver by generating a confidence coefficient based on the refractive index assigned to a surface that reflected the GNSS signal, and wherein a higher refractive index indicates a more reflective surface and is assigned a higher confidence coefficient.

2. The system of claim 1, wherein the processor system determines the surface that reflected the reflected GNSS signal based on a location of the satellite provided by the satellite location database and locations of 3D objects provided by the 3D reflective surface map, wherein the processor system utilizes a location of the surface to correct a pseudo-range associated with the reflected GNSS signal.

3. The system of claim 1, wherein the processor system calculates a pseudo-range for each received GNSS signal based on time of flight of the received GNSS signal and the processor system identifies a received GNSS signal as a reflected GNSS signal based on a determination that the calculated pseudo-range is erroneous, and wherein the processor system determines that the calculated pseudo-range is erroneous if a difference between the calculated pseudo-range and an expected pseudo-range is greater than a threshold value.

4. The system of claim 3, wherein the processor system determines the expected pseudo-range based on a current and/or predicted position estimate and a location of the satellite provided by the satellite location database.

5. The system of claim 3, wherein the expected pseudo-range is based on a pseudo-range associated with a previous epoch.

6. The system of claim 3, wherein the processor system utilizes a combination of line-of-sight GNSS signals and reflected GNSS signals to determine the position estimate, wherein the pseudo-ranges calculated with respect to reflected GNSS signals are corrected prior to being utilized to determine the position estimate.

7. A method of calculating position estimates based on reflected GNSS signals, the method comprising:
   receiving one or more GNSS signals at a GNSS antenna;
   identifying one or more of the received GNSS signals as a reflected GNSS signal;
   calculating a surface that reflected the GNSS signal based on a location of a GNSS satellite that generated the GNSS signal, a current position estimate, and a 3D reflective surface map of surrounding 3D objects; and
   calculating an updated position estimate of the GNSS antenna based on the one or more reflected GNSS signals,
   wherein the 3D reflective surface map further includes a refractive index assigned to each mapped surface and calculating the updated position estimate of the GNSS antenna includes generating a confidence coefficient based on the refractive index assigned to a surface that reflected the GNSS signal, and wherein a higher refractive index indicates a more reflective surface and is assigned a higher confidence coefficient.

8. The method of claim 7, further including for each reflected GNSS signal:
   calculating a corrected pseudo-range for the reflected GNSS signal based on a location of a GNSS satellite that generated the GNSS signal, the surface calculated to have reflected the GNSS signal, and the current position estimate.

9. The method of claim 8, wherein the updated position estimate is based on the corrected pseudo-ranges calculated for each of the one or more reflected GNSS signals.

10. The method of claim 7 further including calculating a pseudo-range for each received GNSS signal based on time of flight of the received GNSS signal, wherein the calculated pseudo-range is determined to be erroneous if a difference between the calculated pseudo-range and an expected pseudo-range is greater than a threshold value, and wherein the expected pseudo-range is determined based on a current position estimate of the GNSS antenna.

11. The method of claim 7, wherein identifying one or more of the received GNSS signals as reflected GNSS signals includes calculating a pseudo-range based on the received GNSS signal and comparing the calculated pseudo-range to a previous epoch pseudo-range calculated for the received GNSS signal, wherein a determination is made that the received GNSS signal is reflected based on a difference between the calculated pseudo-range and previous epoch pseudo-range.

12. A method of calculating position estimates based on reflected GNSS signals, the method comprising:
   receiving one or more GNSS signals at a GNSS antenna;
   identifying one or more of the received GNSS signals as a reflected GNSS signal;
   calculating a surface that reflected the GNSS signal based on a location of a GNSS satellite that generated the GNSS signal, a current position estimate, and a 3D reflective surface map of surrounding 3D objects;

calculating a corrected pseudo-range for the reflected GNSS signal based on a location of the GNSS satellite that generated the GNSS signal, the surface calculated to have reflected the GNSS signal, and the current position estimate; and calculating an updated position estimate of the GNSS antenna based on the one or more reflected GNSS signals, wherein the 3D reflective surface map includes a refractive index assigned to each mapped surface, wherein the calculating the corrected pseudo range includes generating a confidence coefficient based on the refractive index assigned to the surface that reflected the GNSS signal, and wherein a higher refractive index indicates a more reflective surface and is assigned a higher confidence coefficient.

\* \* \* \* \*